United States Patent
Svendsen

(10) Patent No.: US 10,243,753 B2
(45) Date of Patent: Mar. 26, 2019

(54) METHODS FOR SHARING IMAGES CAPTURED AT AN EVENT

(71) Applicant: Hugh Blake Svendsen, Chapel Hill, NC (US)

(72) Inventor: Hugh Blake Svendsen, Chapel Hill, NC (US)

(73) Assignee: Ikorongo Technology, LLC, Chapel Hill, NC (US)

( * ) Notice: Subject to any disclaimer, the term of this patent is extended or adjusted under 35 U.S.C. 154(b) by 427 days.

(21) Appl. No.: 14/574,513

(22) Filed: Dec. 18, 2014

(65) Prior Publication Data

US 2017/0070358 A1 Mar. 9, 2017

Related U.S. Application Data

(60) Provisional application No. 61/917,984, filed on Dec. 19, 2013, provisional application No. 62/067,037, filed on Oct. 22, 2014.

(51) Int. Cl.
*H04L 12/18* (2006.01)
*H04L 29/08* (2006.01)

(52) U.S. Cl.
CPC .......... *H04L 12/1822* (2013.01); *H04L 67/02* (2013.01); *H04L 67/04* (2013.01); *H04L 67/10* (2013.01); *H04L 67/18* (2013.01)

(58) Field of Classification Search
CPC ..... H04L 12/1822; H04L 67/10; H04L 67/04; H04L 67/02; H04L 67/18
See application file for complete search history.

(56) References Cited

U.S. PATENT DOCUMENTS

| | | | |
|---|---|---|---|
| 6,526,158 B1 * | 2/2003 | Goldberg | G03D 15/001 382/103 |
| 6,591,068 B1 | 7/2003 | Dietz | |
| 6,745,186 B1 | 6/2004 | Testa et al. | |

(Continued)

FOREIGN PATENT DOCUMENTS

WO 2009070841 A1 6/2009

OTHER PUBLICATIONS

Erickson, On Location: Socio-locative Broadcasting As Situated Rhetorical Action, Stanford University Dissertations & Theses 3343578, 2008, 151 pages, ISBN 9780549986065, ProQuest UMI Dissertations Publishing 2008, Ann Arbor, U.S.

*Primary Examiner* — Arvin Eskandarnia
*Assistant Examiner* — Juan C Turriate Gastulo

(57) ABSTRACT

In the present disclosure, methods, systems, and non-transitory computer readable medium are described whereby images are obtained at a server or another suitable computing device. The images may contain metadata indicating the time, date, and geographic location of capture. In one aspect of the present disclosure, this metadata may be used to determine that the images were captured at an event that is still occurring (in-process event). Users who have uploaded images that are captured at the event may be invited to join an image sharing pool. In response to accepting the invitation, the images provided by the user may be contributed to the image sharing pool, and other users having also joined the image sharing pool will be able to access the newly contributed images. The event associated with the sharing pool may be detected by the system or proposed by a moderator.

27 Claims, 25 Drawing Sheets

(56) References Cited

U.S. PATENT DOCUMENTS

| | | |
|---|---|---|
| 6,819,783 B2 | 11/2004 | Goldberg et al. |
| 7,035,440 B2 | 4/2006 | Kaku |
| 7,260,587 B2 | 8/2007 | Testa et al. |
| 7,391,886 B1 | 6/2008 | Clark et al. |
| 7,472,134 B2 | 12/2008 | Kaku |
| 7,526,106 B1 | 4/2009 | Clark et al. |
| 7,561,723 B2 | 7/2009 | Goldberg et al. |
| 7,619,660 B2 | 11/2009 | Grosvenor |
| 7,730,036 B2 | 6/2010 | Blose et al. |
| 7,881,968 B2 | 2/2011 | David |
| 7,953,690 B2 | 5/2011 | Luo et al. |
| 7,965,908 B2 | 6/2011 | Hayashi |
| 7,966,223 B2 | 6/2011 | David |
| 8,014,572 B2 | 9/2011 | Xiao et al. |
| 8,189,880 B2 | 5/2012 | Wen et al. |
| 8,260,674 B2 | 9/2012 | David |
| 8,284,990 B2 | 10/2012 | Ma et al. |
| 8,306,284 B2 | 11/2012 | Goldberg et al. |
| 8,458,174 B1 | 6/2013 | Duerig |
| 8,510,383 B2 | 8/2013 | Hurley et al. |
| 8,543,454 B2 | 9/2013 | Fleischman et al. |
| 8,612,533 B1 | 12/2013 | Harris et al. |
| 8,731,819 B2 | 5/2014 | Dzubay et al. |
| 8,761,523 B2 | 6/2014 | Cok et al. |
| 9,269,081 B1 * | 2/2016 | Panzer .................. G06Q 50/01 |
| 2007/0250496 A1 | 10/2007 | Halliday et al. |
| 2008/0052349 A1 | 2/2008 | Lin |
| 2008/0310688 A1 | 12/2008 | Goldberg |
| 2010/0036875 A1 | 2/2010 | Miezianko et al. |
| 2010/0103463 A1 | 4/2010 | Joshi et al. |
| 2010/0191728 A1 | 7/2010 | Reilly et al. |
| 2010/0250672 A1 * | 9/2010 | Vance .................. G06Q 10/109 709/204 |
| 2011/0022529 A1 | 1/2011 | Barsoba et al. |
| 2011/0066743 A1 * | 3/2011 | Hurley .................. H04W 4/02 709/231 |
| 2011/0145275 A1 | 6/2011 | Stewart |
| 2011/0161423 A1 * | 6/2011 | Pratt .................. G06Q 10/06 709/205 |
| 2011/0182485 A1 | 7/2011 | Shochat et al. |
| 2011/0188742 A1 | 8/2011 | Yu et al. |
| 2011/0211737 A1 | 9/2011 | Krupka et al. |
| 2012/0166533 A1 | 6/2012 | Rubinstein et al. |
| 2012/0221687 A1 | 8/2012 | Hunter et al. |
| 2012/0232960 A1 * | 9/2012 | Smith .................. G06Q 40/00 705/7.35 |
| 2012/0250950 A1 | 10/2012 | Papakipos et al. |
| 2012/0265758 A1 | 10/2012 | Han et al. |
| 2012/0278387 A1 * | 11/2012 | Garcia .................. G06Q 50/01 709/204 |
| 2012/0278395 A1 | 11/2012 | Garcia |
| 2013/0035114 A1 * | 2/2013 | Holden .................. H04W 4/08 455/456.3 |
| 2013/0117365 A1 * | 5/2013 | Padmanabhan ....... H04W 4/206 709/204 |
| 2013/0124508 A1 | 5/2013 | Sylvain et al. |
| 2013/0130729 A1 * | 5/2013 | Cok .................. H04N 21/4788 455/466 |
| 2013/0275505 A1 | 10/2013 | Gauglitz et al. |
| 2014/0122592 A1 * | 5/2014 | Houston ............. H04L 67/1095 709/204 |
| 2014/0214843 A1 | 7/2014 | Arvig |
| 2015/0019523 A1 * | 1/2015 | Lior .................. G06Q 10/109 707/708 |
| 2015/0116360 A1 * | 4/2015 | Jones .................. G06T 11/60 345/634 |

* cited by examiner

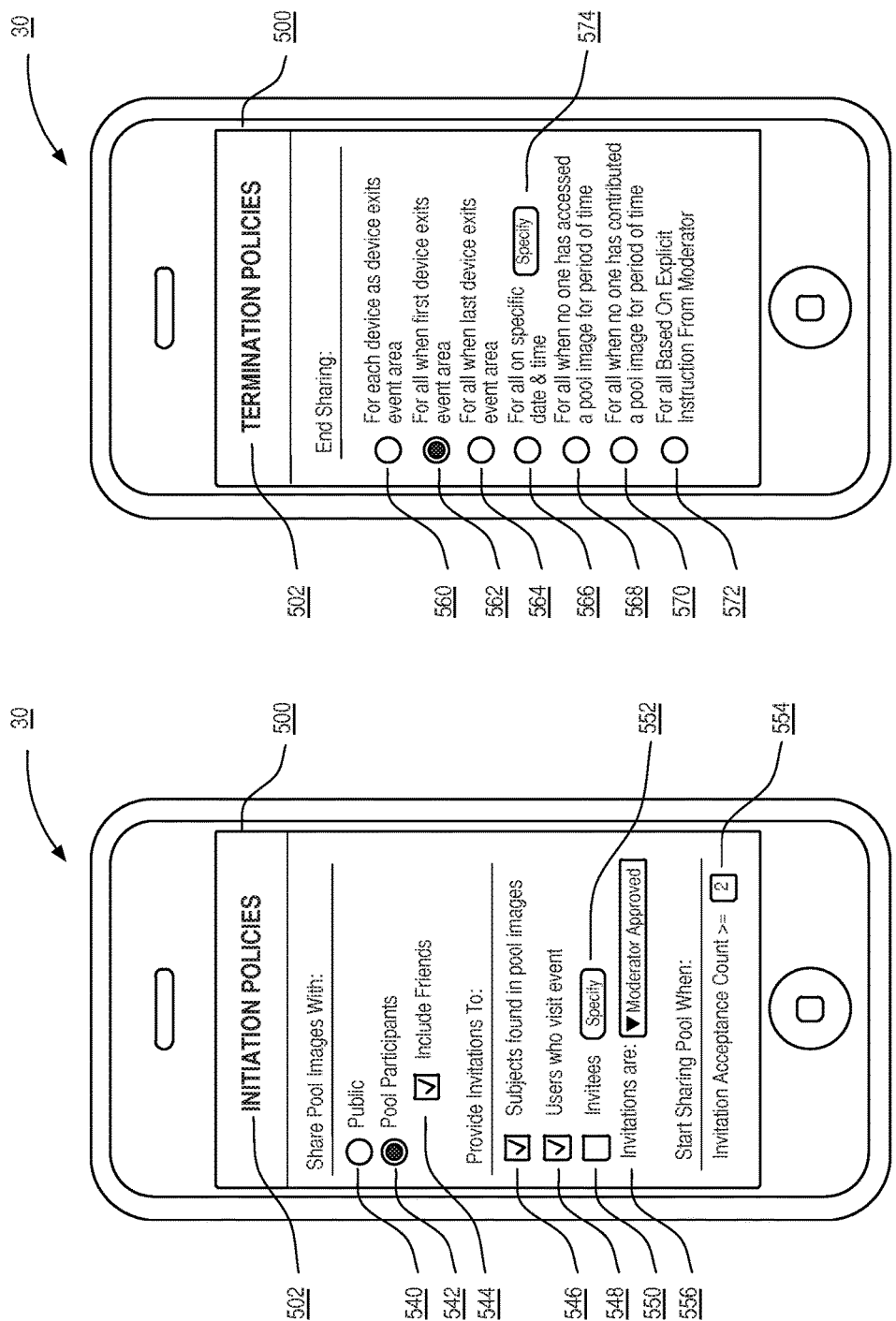

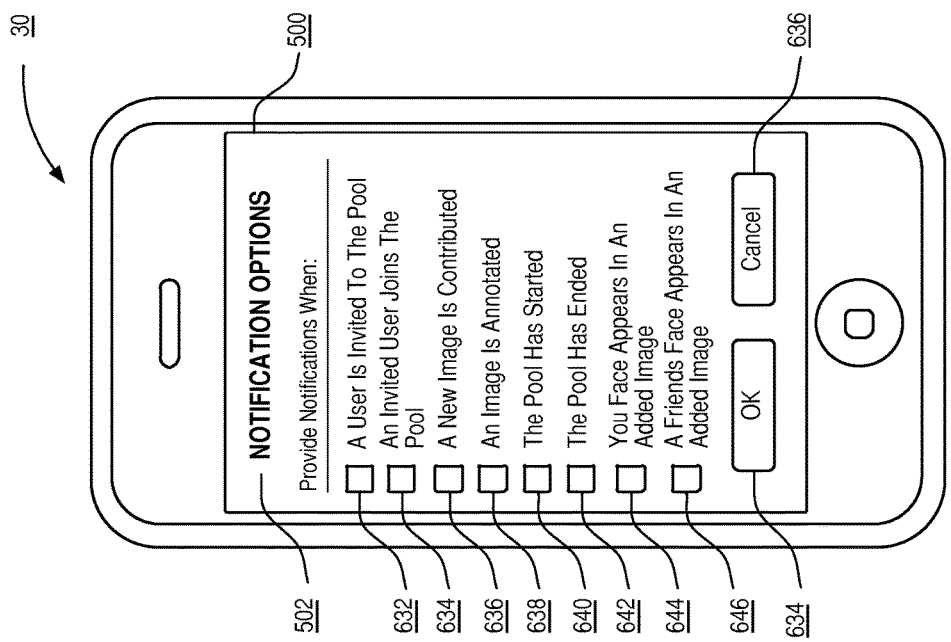
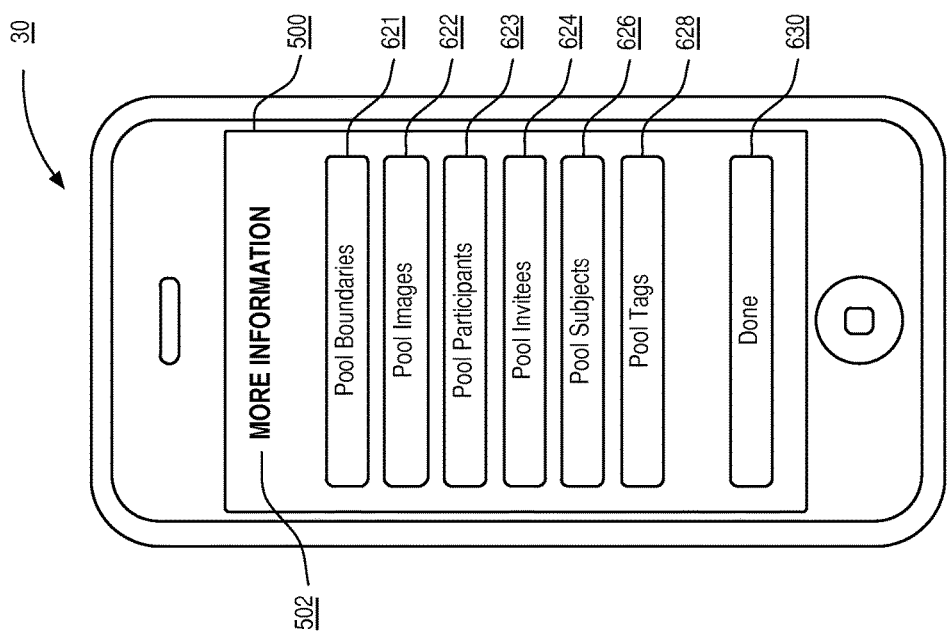
FIG. 6D
FIG. 6C

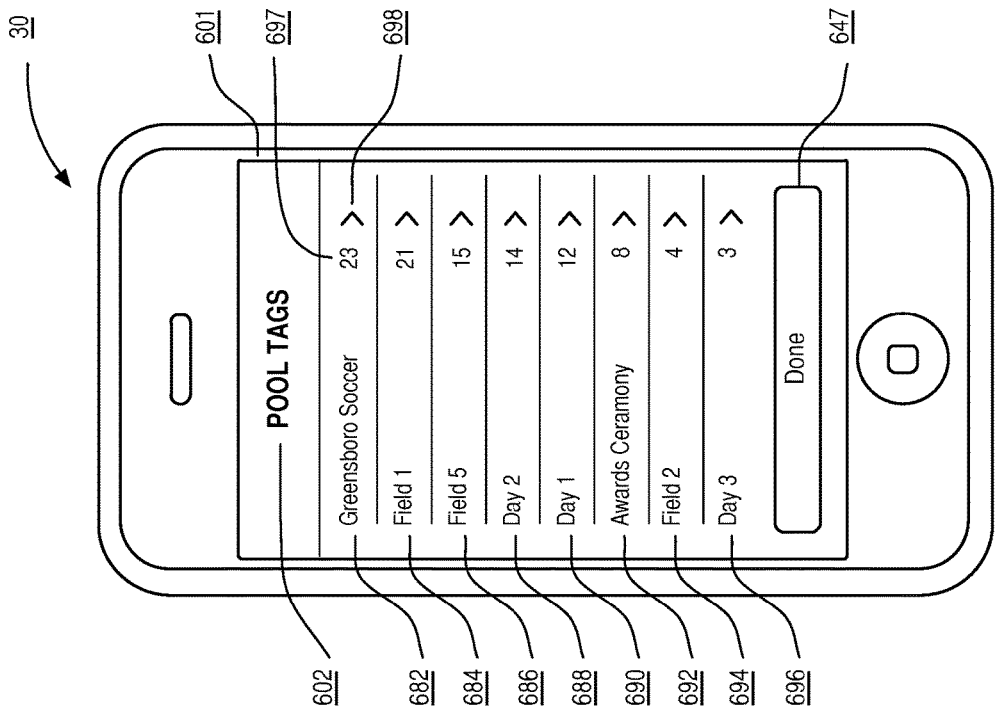
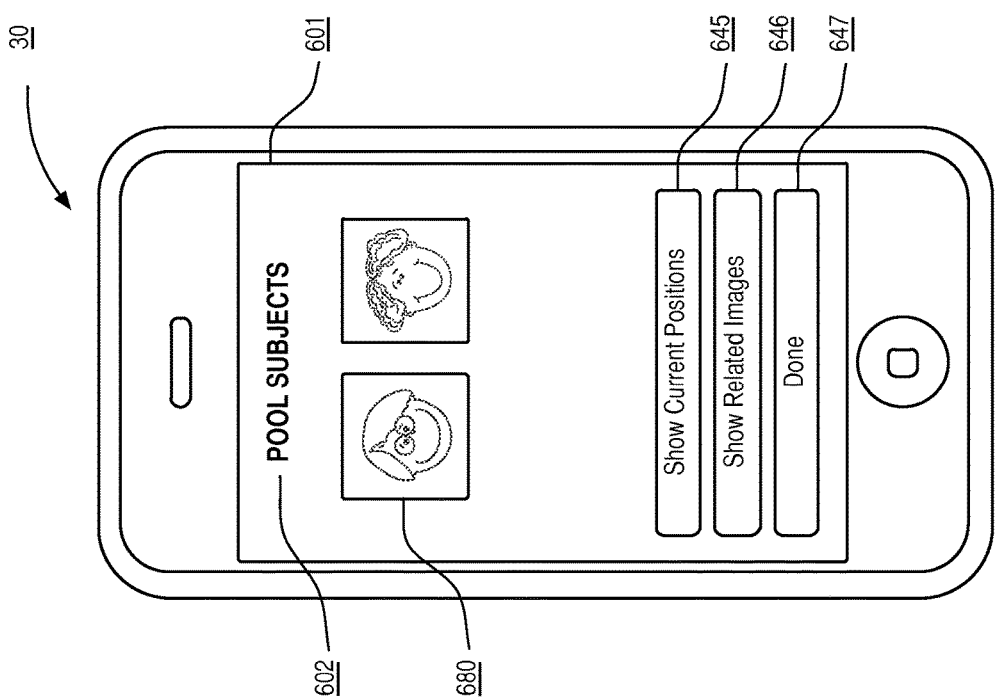

METHODS FOR SHARING IMAGES CAPTURED AT AN EVENT

CROSS REFERENCE TO RELATED APPLICATION

This application claims the benefit of U.S. Provisional Patent Applications Nos. 61/917,984, filed Dec. 19 2013, and 62/067,037, filed Oct. 22 2014, the disclosures of which are incorporated herein by reference in their entirety.

TECHNICAL FIELD

The present disclosure relates to forming an image sharing group to share images through an image sharing pool. The images may be selected for the pool in response to determining that the images were taken at the same event. An event may be determined based on time, date, geographic location, other criterion, or combinations thereof.

BACKGROUND

In recent years there has been an enormous increase in the in the number of digital images being captured. This increase has been fueled by decreasing digital camera prices, increases in quality and ease of use of digital cameras, and the broad adoption of digital image capture features in cell phones and smartphones at all price levels. This proliferation of digital imaging content has exacerbated the long-standing problem of sharing digital images with those who would desire to view them.

Many companies, technologies, and approaches have emerged to address this issue of image sharing. Some companies have taken an image centric centralized approach whereby users upload images to a server and invite other uses to come and view the images. Examples of companies taking this approach include ShutterFly™, Snapfish™, Flickr™, and the like. Other companies take a user centric social approach, whereby existing friend connections may be exploited to distribute images. Examples of companies taking this approach include FaceBook™, MySpace™, and the like.

The problem with these traditional approaches is that they require considerable effort by the sharing user and are not pre-emptive in nature. Predominately, the users must go looking for the images they are interested in instead of the images finding them. In view of the foregoing, there is a need for improved techniques and systems for image sharing among users.

SUMMARY OF THE DISCLOSURE

With the proliferation of electronic devices capable of capturing, storing, and sharing digital images, there is a need for improved methods of sharing digital images requiring minimal effort from users. In the present disclosure, methods, systems, and non-transitory computer readable medium are described whereby images are obtained at a server or another suitable computing device. The images may contain metadata indicating the time, date, and geographic location of capture. In one aspect of the present disclosure, this metadata may be used to determine that the images were captured at an event that is still occurring (in-process event). Users who have uploaded images that are captured at the event may be invited to join an image sharing pool. In response to accepting the invitation, the images provided by the user may be contributed to the image sharing pool, and any other users having also joined the image sharing pool will be able to access the newly contributed images. Conditions may be specified, by a pool moderator, under which the event will be determined to have ended.

In another aspect of the present disclosure, a first device may submit information defining an event to a server. The submitted event information may include at least geographical boundaries (an area on a map for example) and time boundaries (start time and end time for example). A second device that is located at the event (i.e. the device is within the area on the map between the start time and end time) may submit an image captured at the event to the server. The server may determine that a third device is currently located at the event, and may send information regarding the image submitted by the second device. The third device may now be able to view the image submitted by the second device.

The devices may be mobile devices capable of determining their geographic location and of capturing and transmitting images over the Internet and/or another suitable network. The most likely example devices include, but are not limited to, a smartphone, tablet computing device, network enabled camera, or another computing device. Examples of events would include, but are not limited to, social gatherings (i.e. weddings, parties, picnics, cruises, car trips, etc.) and sporting events (soccer tournament, football game, horse race etc.). The server may select devices to invite to join the image sharing pool based on determining devices that visited the event, devices that are still present at the event, devices associated with users whose faces are present in images captured at the event, the like and combinations thereof.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 5C illustrates an exemplary user interface of a computing device for displaying initiation policy information for an event;

FIG. 5D illustrates an exemplary user interface of a computing device for displaying termination policy information for an event;

FIG. 6C illustrates an exemplary user interface of a computing device for displaying information regarding an image sharing pool according to one aspect of the present disclosure;

FIG. 6D illustrates an exemplary user interface of a computing device for providing a user with an ability to configure notification options for an image sharing pool according to one aspect of the present disclosure;

FIG. 6I illustrates an exemplary user interface of a computing device for displaying pool subject information for an image sharing pool according to one aspect of the present disclosure;

FIG. 6J illustrates an exemplary user interface of a computing device for displaying pool tag information for an image sharing pool according to one aspect of the present disclosure;

DETAILED DESCRIPTION

Figure 1A:
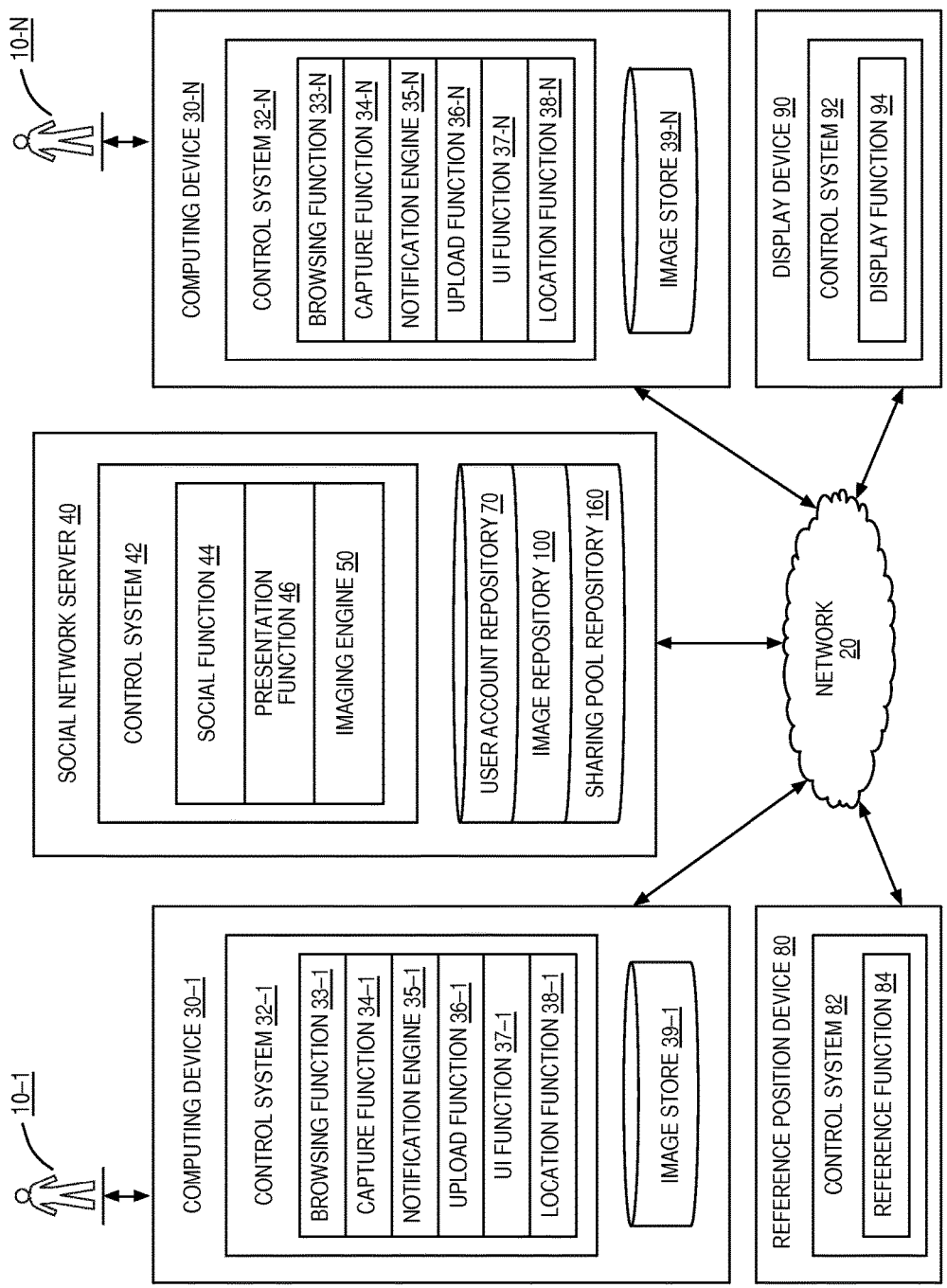
FIG. 1A illustrates an exemplary system for forming an image sharing pool.

The present disclosure is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As referred to herein, the term "computing device" should be broadly construed. It can include any type of mobile device, for example, a smart phone, a cell phone, a pager, a personal digital assistant (PDA, e.g., with GPRS NIC), a mobile computer with a cellular radio, or the like. A typical mobile device is a wireless data access-enabled device (e.g., an iPHONE® smart phone, a BLACKBERRY® smart phone, a NEXUS ONE™ smart phone, an iPAD™ device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on a mobile device, the examples may similarly be implemented on any suitable computing device 30.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Operating environments in which embodiments of the present disclosure may be implemented are also well-known. In a representative embodiment, a computing device 30 (shown in FIG. 1 for example), such as a mobile device, is connectable to a transmission functionality that varies depending on implementation. Thus, for example, where the operating environment is a wide area wireless network (e.g., a 2.5G network, a 3G network, or a 4G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, the present disclosure may be implemented in other and next-generation mobile networks and devices as well. The mobile device is the physical equipment used by the end user, typically a subscriber to the wireless network. Typically, a mobile device is a 2.5G-compliant device, 3G-compliant device, or a 4G-compliant device) that includes a subscriber identity module (SIM), which is a smart card that carries subscriber-specific information, mobile equipment (e.g., radio and associated signal processing devices), a user interface (or a man-machine interface (MMI), and one or more interfaces to external devices (e.g., computers, PDAs, and the like). The mobile device may also include a memory or data store. The presently disclosed subject matter is now described in more detail. For example, FIG. 1A illustrates a block diagram of an exemplary social network system for forming an image sharing pool according to embodiments of the present disclosure. Referring to FIG. 1A, the social network system includes a social network server 40. The social network server 40 is configured to provide a computing device 30-1 operated by a user 10-1 with an upload function 36-1 to transfer one or more images to the image repository 100. The images may be captured by the capture function 34 of the computing device 30-1 or otherwise received by the computing device 30-1. Subsequent to storage in the image repository 100, other users, such as user 10-N, may access the images for viewing by operation of his or her respective computing device 30-N. The computing device 30-1 and other computing devices 30-N may be configured for communication with the social network server 40 via a network 20. The computing device 30-1 may be any type of computing device 30 capable of receiving communications from another device. The computing device 30-1 comprises a number of functional components. This representation of the computing device 30-1 is meant to be for convenience of illustration and description, and it should not be taken to limit the scope of the present disclosure as one or more functions may be combined.

Typically, these components are implemented in software (as a set of process-executable computer instructions, associated data structures and the like). One or more of the functions may be combined or otherwise implemented in any suitable manner (e.g., in hardware, in firmware, in combined hardware and software, or the like). Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions. The computing device 30-1 may include a graphics-rendering engine for displaying information and images to the user 10-1 in the usual manner. In one embodiment of the present disclosure, the graphics-rendering engine may be used to display the exemplary user interface illustrated in FIG. 6. The computing device 30-1 is Internet-accessible and can interact with the social network server 40, by use of any suitable Internet protocols such as HTTP, HTTPS, FTP, and the like. The social network server 40 is shown as a single device but this is not a requirement either; one or more programs, processes, or other code may comprise the social network server 40 and be executed on one or more machines (in one or more networked locations).

The operation of the system can be described by the following example. As shown in FIG. 1A, the computing device 30-N includes various functional components and associated data stores to facilitate the operation. The operation of the disclosed methods may be implemented using system components other than as shown in FIG. 1A.

In this example system, various images may be stored in an image repository 100. Access for computing device 30-N, or other computing devices, to images stored in the image repository 100 may be based on permissions. An owner of the image or another authorized individual may establish permissions associated with an image. For example, the image owner 10-1 may interact with the computing device 30-1 to set a permission setting for an image and/or a portion of text associated with the image, such as an annotation or tag associated with the image. As an example, a permission setting may include one or more access modes. An access mode may be set for allowing friends only, friends of friends, members of a group of users, and all users to access an image and/or text associated with the image. In some instances, any user permitted to access an image may also be permitted to annotate the image.

Users 10 of the social network server 40 may interact with the social network server 40 using their respective computing devices, such as computing device 30. A computing device 30 may be, for example, a personal computer, tablet computer, smart phone, set top box, game console, or any device configured with computing hardware, software, and/or firmware configured to implement the functions of the computing device 30 in accordance with embodiments of the present disclosure. A computing device, such as computing device 30, may include a control system (e.g., control systems 32), which is configured to communication with and to interact with the social network server 40. In embodiments of the present disclosure, a browsing function, such as browsing function 33, is a web browser capable of communicating with the social network server 40 using HTTP protocols and rendering HTML at the corresponding computing device 30. A capture function, such as capture functions 34, may operate to manage the capture of images by an image capture device of the computing device 30, and the subsequent storing of the images in an image stored (e.g., image stores 39) and/or the image repository 100. Transmission of the images from a computing device 30 to the social network server 40 may be implemented by an upload function, such as upload functions 36. A location function, such as location functions 38, may operate to determine geographical coordinates of a location at which one or more images were captured by the capture function 34 for the purpose of storing or otherwise associating the capture location with the image(s). The location function may determine the location based on technologies including GPS (satellite assisted), A-GPS (tower assisted), IP Address Translation, and or WIFI triangulation services (such as Skyhook for example).

Note that some computing devices 30 may not include all functions described herein. For example, some devices may not include an image capture function. The notification engine 35 may operate to receive notifications at the computing device 30. The UI function 37 may provide notifications to the user 10 of the computing device 30. The UI function inter alia operates to display the user interface elements such as those described in FIG. 6. The UI function may include, but is not limited to, a display, a speaker, one or more buttons, and/or the like.

The social network server 40 may be comprised of a number of functions. For example, the social network server 40 may include a control system 42 comprising a social function 44 configured to manage user accounts 72 in a user accounts repository 70. An imaging engine 50 may implement all functions associated with the interaction involving images and is further detailed in the example of FIG. 1B, which illustrates a block diagram of an example imaging engine in accordance with embodiments of the present disclosure. In embodiments of the present disclosure, the social function 44, presentation function 46, and imaging engine 50 are implemented as part of the same social network server 40, but that need not be the case. For performance and scalability reasons, these functions may be implemented as separate servers or computing arrangements. The social network server 40 further comprises user account repository 70, an image repository 100, and an image sharing pool repository 160 that are further described in corresponding FIGS. 1C, 1D, and 1F. In embodiments of the present disclosure, the user account repository 70, image repository 100, and image sharing pool repository 160 are implemented as a single database or multiple databases. These databases may be stored on the social network server 40, on servers accessible to the social network server 40, or any combination thereof.

The social network server 40 comprises a number of functional components. This representation of the social network server 40 is meant to be for convenience of illustration and description, and it should not be taken to limit the scope of the present disclosure as one or more functions may be combined. Typically, these components are implemented in software (as a set of process-executable computer instructions, associated data structures and the like). One or more of the functions may be combined or otherwise implemented in any suitable manner (e.g., in hardware, in firmware, in combined hardware and software, or the like). Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

In accordance with embodiments, some events may change in location over time. For example, a cruise ship trip, where the event changes position as the cruise ship moves from port to port. In these embodiments, the event 190 location changes as it tracks the position of a reference position device 80. In accordance with embodiments of the present disclosure, the reference position device 80 may be a dedicated device, mobile cellular phone, or the like. When a movable event is occurring, such as on the cruise ship, the event 190 may be initiated at any point in the trip with a pool moderator specifying the reference position device 80. As the reference position device 80 moves along with the ship, the location of the event is periodically updated to account for the changing position of the ship by receiving reference positions from the reference position device 80. The reference position device 80 may be comprised of a number of functions. For example, the reference position device 80 may include a control system 82 comprising a reference function 84 to provide the aforementioned reference positions. In one embodiment of the present disclosure, the reference position device may be the computing device 30 of the pool moderator 174.

The reference position device 80 comprises a number of functional components (all but one not shown for the sake of brevity). This representation of the reference position device 80 is meant to be for convenience of illustration and description, and it should not be taken to limit the scope of the present disclosure as one or more functions may be combined. Typically, these components are implemented in software (as a set of process-executable computer instructions, associated data structures and the like). One or more of the functions may be combined or otherwise implemented in any suitable manner (e.g., in hardware, in firmware, in combined hardware and software, or the like). Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

In accordance with embodiments, an activity feed associated with an image sharing pool 161 feed may be presented on one or more display devices 90 whose primary purpose in the context of this disclosure is to present an activity feed. The display device 90 may not be capable of providing images and associated geographical location information to the social network server 40. Examples of display devices 90 would be a network enabled TV, set top box coupled to a display, digital picture frame, electronic billboard display device, and/or a venue display device such as a Jumbotron™. In this manner, the system may be operable to present images contributed to the sharing pool 161 on a display device 90 easily viewable my multiple people. A pool moderator 174 may configure the operation of the display device 90, and may approve and/or select the images to be presented on the display device 90. The display device 90 may be comprised of a number of functions. For example, the display device 90 may include a control system 92 comprising a display function 94. The display function 94 operates to receive the images, format, and present them on the display device.

The display device 90 comprises a number of functional components (all but one not shown for the sake of brevity). This representation of the display device 90 is meant to be for convenience of illustration and description, and it should not be taken to limit the scope of the present disclosure as one or more functions may be combined. Typically, these components are implemented in software (as a set of process-executable computer instructions, associated data structures and the like). One or more of the functions may be combined or otherwise implemented in any suitable manner (e.g., in hardware, in firmware, in combined hardware and software, or the like). Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Those of ordinary skill in the art will appreciate that the network 20 is not limited by the implementations listed above. More specifically, the network 20 may be any type of network 20 suitable to allow interaction between the computing devices 30 and the social network server 40. For example, the network 20 may be a wired network, a wireless network, or any combination thereof. Further, the network 20 may include a distributed computing network, an intranet, a local-area network (LAN) and/or a wide-area network (WAN), or any combination thereof.

Figure 1C:
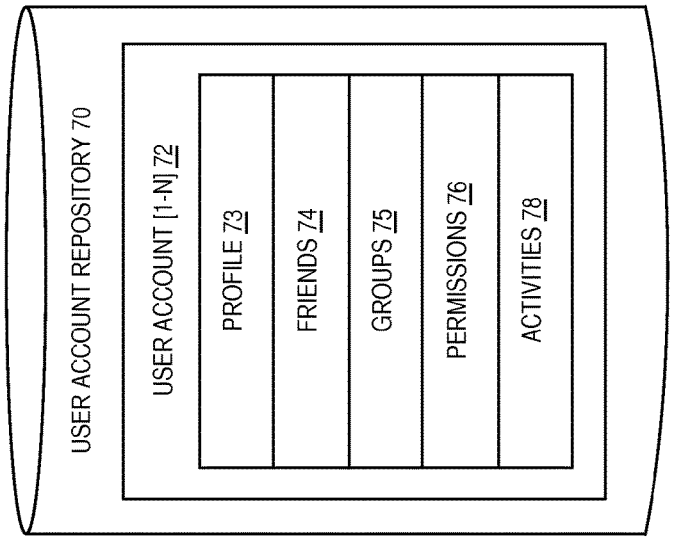
FIG. 1C illustrates a block diagram for an exemplary implementation of a user accounts repository according to an implementation of the present disclosure.
Figure 1B:
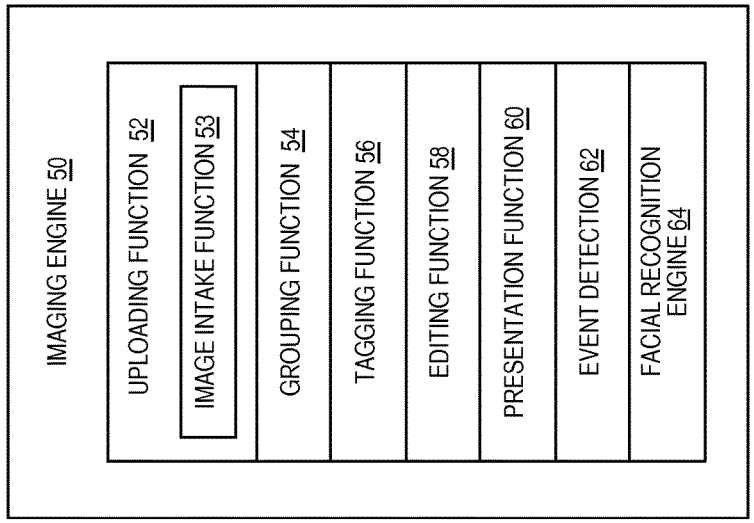
FIG. 1B illustrates a block diagram of an exemplary imaging engine in accordance with embodiments of the present disclosure.

Referring to FIG. 1B, the imaging engine 50 may include an uploading function 52 configured to receive uploaded images from a computing device, such as the computing device 30 shown in FIG. 1A via its upload function 36. In one aspect of the present disclosure, an image intake function 53 further processes the uploaded image according to the steps of FIG. 3A. In another aspect of the present disclosure the images are stored and the images are further processed at a later time. A grouping function 54 may be configured to allow the computing device 30 to assign and modify the grouping of uploaded images. The grouping may be specified at the time of upload, or it may be changed at a later time using the browsing function 33.

The image may be tagged using a tagging function 56. One form of tagging may involve tagging subject faces occurring in the images. As used herein, a subject face refers to the face of a subject (e.g., a person) that appears in an image. The subject may represent a registered user (has a user account 72), an unregistered user of the system (has no user account 72 but is interacting with the system), or a non-user (has not interacted with the system). Likewise a pool subject 180 represents a subject whose face has been captured in a pool image 188 (i.e. an image shared by a sharing pool 161). There are several mechanisms for tagging subject faces in images that have proven to provide acceptable results with varying levels of user involvement. One such system involves a user uploading images to their account on a social networking system such as FACEBOOK®. Once uploaded, any friends of the user who are able to access the uploaded images may use his or her computing device 30 to tag faces within the images. Example benefits of this solution include distributing the effort over multiple participants, notifications to tagged subjects, and a uniform name space of tagged subjects. Other solutions for tagging faces in images include programmatic approaches. In these systems, a computer may be programmed to detect faces within the images, and identify the subjects corresponding to the faces by matching the detected faces to a set of known subject images. In some systems, such as IPHOTO®, the user is required to confirm the matches. In other systems, such as PICASSO®, no user confirmation is required. Example benefits of this approach include the efficiency inherent in having a computer identify the subject faces. As a result, large numbers of images may be processed efficiently.

An editing function 58 may be configured to provide for the manipulation of images. In an implementation of the present disclosure, image editing functions may include cropping, rotation, resizing, brightness modification, contrast modification, exposure modification, tone modification, and the like. A presentation function 60 may be configured to render an image or group of images within a presentation environment such as the user interface illustrated in FIG. 6. An event detection function 62 operates to determine if an event has occurred or is occurring. In one aspect of the present disclosure the steps of FIG. 3B are used to identify an event. The facial recognition engine 64 provides facilities for detecting, matching, and identifying faces within images. These functions are used inter alia for determining the boundaries of an event (spatial, temporal, and altitudinal) and identifying potential invitees for an event.

FIG. 1C illustrates a block diagram for an exemplary implementation of a user account repository 70 according to an implementation of the present disclosure. The user account repository 70 contains a plurality of user account records 72 including information about a user (e.g., user 10) of the social network server 40. A profile 73 may include information describing the user. In an implementation of the present disclosure, the profile 73 information may include gender, age, birthday, marital status, residential address, favorite songs, favorite movies, favorite books, and the like. Users may include one or more friends 74 established through an invitation process provided by the social function 44 shown in FIG. 1A. Friends 74 may be assigned to groups 75 for the purpose of assigning permissions 76. Activities 78 for users may be monitored and recorded for future use. In an aspect of the present disclosure, this activity information might include locations visited, movies watched, URLs browsed, songs listened to, items purchased, and the like.

Figure 1D:
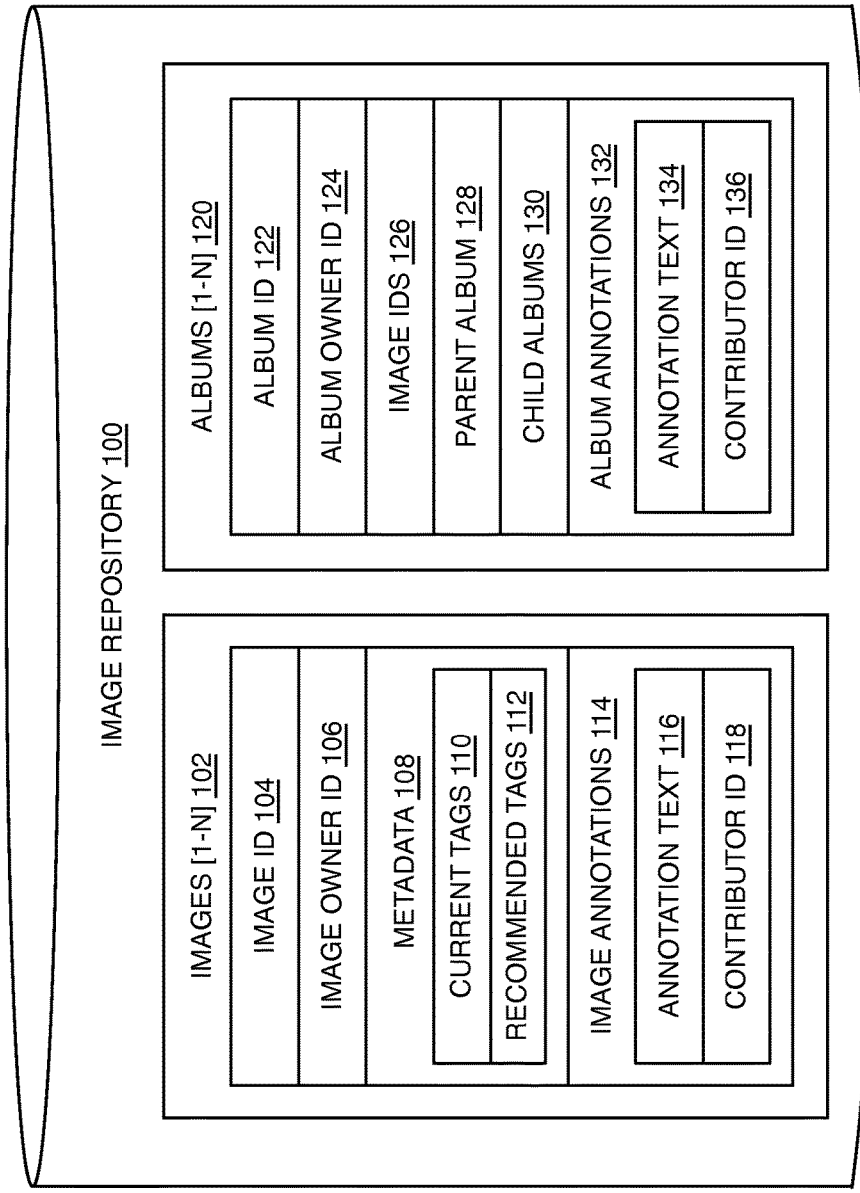
FIG. 1D illustrates a block diagram of an exemplary image repository according to an aspect of the present disclosure.
Figure 1E:
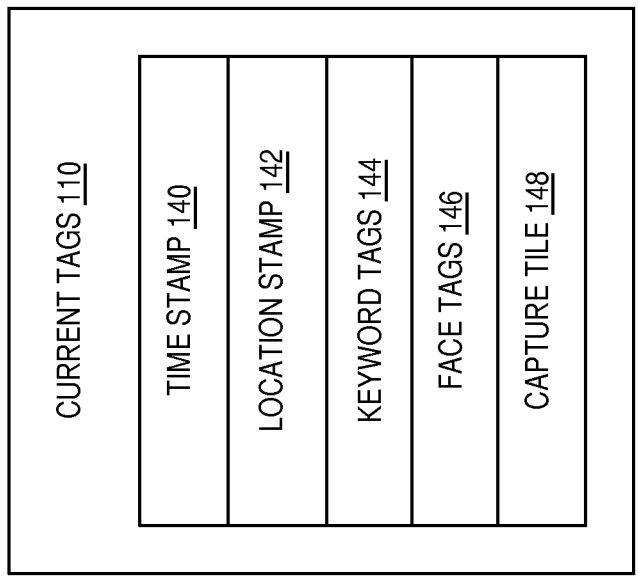
FIG. 1E illustrates a block diagram of an exemplary current tag record according to an aspect of the present disclosure.

FIG. 1D illustrates a block diagram of an image repository 100 according to an aspect of the present disclosure. The image repository 100 may include a plurality of images 102. Images 102 are comprised of multiple elements. The image ID 104 is a unique identifier assigned to the image. The image owner ID 106 is a unique identifier indicating the user 10 who uploaded the image. A metadata field 108 contains information about the contents of an image 102. Examples of metadata may include, but are not limited to, capture date, capture time, camera capture settings, camera make model and serial number, capture location, tags, and the like. As used herein, a tag is a non-hierarchical keyword or term assigned to a piece of information such as a digital image. This kind of metadata can help to describe an item and to allow it to be found again by browsing or searching. Tags selection may be automated by the system. In one aspect of the system the tags are automatically assigned to an image by the system. In another aspect of the system, the tags are recommended to the user, but the user performs the final selection from among the recommended tags 112. In another aspect the user identifies and selects the tags. In another aspect of the system, the user selects tags from pre-defined vocabularies. Current tags 110 indicate the tags currently associated with the image 102. Recommended tags 112 indicate the tags that have been recommended for association with the image 102. The same tag may appear as both a current tag 110 and a recommended tag 112 if a recommended tag 112 has been associated with the image 102 as a current tag 110. Images 102 may each have a plurality of annotations 114. Annotations 114 may each be comprised of an annotation 116 and a contributor ID 118 identifying the user who authored the annotation 116.

Images may be grouped into an album 120. Albums may be assigned a unique album ID 122. The album owner ID 124 references the user 10 who owns the album. The images 102 comprising the album 120 are referenced by their image ID 104 126. Albums may be constructed in a hierarchical structure, containing images and other albums. A parent album 128 may reference an album containing an album. A child album 130 contains references to other albums contained in an album. Albums may also contain annotations 132. The annotations are comprised of annotation text 134 and a contributor ID 136 referencing the user 10 who contributed the annotation. Recommended tags 112 may be determined as needed, or they may be determined as part of a batch process that executes on a periodic basis. The tags may be stored as part of the image file or in a separate database or file referring to the image.

As used herein, the term "event" may refer to a gathering of users and associated devices at a geographical area, date, and time. An event can have a start time, with no end time specified. It may also have and end time in the future, or moderator supplied criteria under which the event can be determined to have ended. In this case, the event is said to be an in-process event. An event may also have a geographic area that changes over time, such as in the case of a party on a cruise ship, where the geographic location of the party is stationary on the ship, but the ship is moving, and therefore the geographic location of the event is moving. An event may also comprise altitudinal information. An event may be occurring, for example, on the 21st and 47th floor of a high-rise condo tower. To be able to distinguish between the two events, it is important to include the altitudinal information. Two events occurring in the same geographic area but two different altitudes may be distinguished through differing subjects appearing in the images, but more certainty may be achieved through the inclusion of altitudinal data in the image metadata 108 of the captured images.

An image sharing pool 161 is built around one or more related events. The image sharing pool 161 represents information including but not limited to pool invitees 176, pool participants 178, pool moderator 174, pool images 188, pool policies 182 and 184, and the one or more related events 190.

Figure 1F:
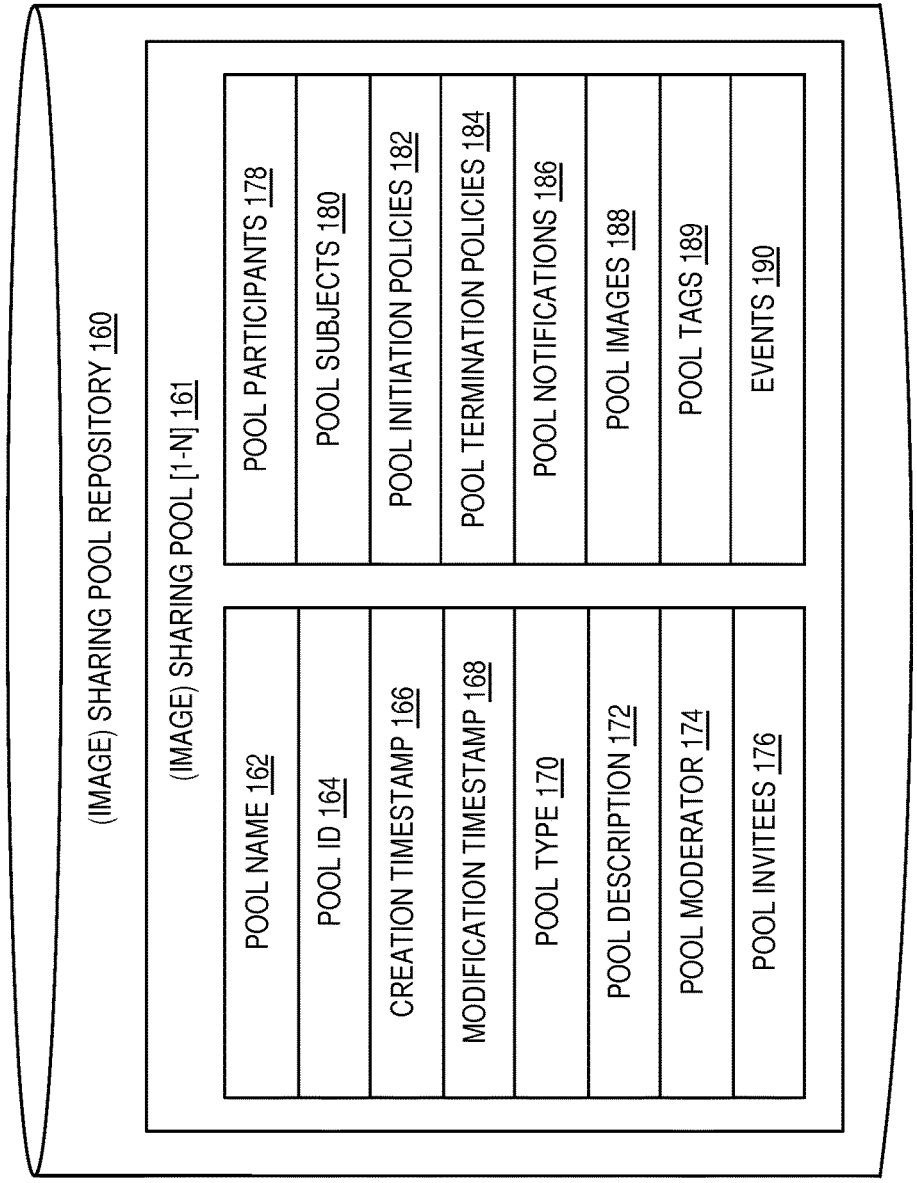
FIG. 1F illustrates a block diagram of an exemplary event repository according to an aspect of the present disclosure.

FIG. 1F illustrates a block diagram of an image sharing pool repository 160 according to one aspect of the present disclosure. The image sharing pool 161 is intended to hold the information representing one or more events 190 event. The event 190 may be an event that has occurred in the past, an event that is progress, or an event that is scheduled for a future time. An image sharing pool 161 is assigned a pool name 162 and a pool ID 164. The pool name may be system generated or selected by a pool moderator 172 depending on pool type 170. The pool ID 164 is a unique identifier of the image sharing pool 161 generated by the system. The creation timestamp 166 represents the date and time the image sharing pool 161 was created, likewise the modification timestamp 168 represent the last modification date and time of the image sharing pool 161. The pool type 170 represents the type of image sharing pool 161. Examples include system initiated and user initiated. In the scenario where a user initiates the image sharing pool 161, that user is the pool moderator 172 of the image sharing pool 161. The pool moderator 172 can control the pool name 162, pool description 172, initial pool invitees 176, pool initiation policies 182, pool termination policies 184, and initial pool tags 189. In the scenario where the event is system generated, those same elements are set by the system, but may be influenced by user participant preferences. The pool description 172 is a description of the image sharing pool 161. The pool description 172 may be used to notify other users of the presence of the event. In accordance with embodiments of the present disclosure, the pool description 172 is a textual description. In accordance with embodiments of the present disclosure, the pool description may be a graphical map of the event area. Pool invitees 176 include persons having been invited to join the image sharing pool 161, but not having as yet accepted the invitation. Pool invitees 176 may be explicitly specified as in the case where the pool moderator 174 specifies a list of initial pool invitees 176, or they may implicitly specified as in the case where the system identifies users 10 present in pool images 188 (pool subjects 180) and invites those pool subjects 180 to join the image sharing pool 161. Pool participants 178 refer to the users 10 of the system who have elected to join an image sharing pool 161. Pool participants 178 may also have a status indicating their standing within the image sharing pool 161. For example, a user may provisionally accept an invitation to join the image sharing pool 161, indicating that they will fully join the image sharing pool 161 at such time that certain conditions are met. Conditions might include a minimum number or users, subjects, or images, having been committed to the image sharing pool 161 through other users 10. Pool subjects 180 refer to persons whose faces have been identified as being contained in at least one pool image 188 in the image sharing pool 161. In one aspect of the present disclosure, pool initiation policies 182 such as those in FIG. 5C, are used to configure and control the onset of sharing. In accordance with embodiments of the present disclosure, pool termination policies 184 such as those in FIG. 5D, are used to configure and control the discontinuation of sharing. The pool moderator in user-initiated image sharing pools controls pool initiation policies 182 and pool termination policies 184. In another aspect of the present disclosure, pool notification policies 186 such as those in FIG. 6D, are used to configure and control the presentation of notifications. Pool notification policies 186 are set and controlled on a per pool participant basis, since different pool participants will have varying preferences in terms of which notifications they will want to receive. A pool image 188 refers to those images having been contributed by pool participants 178 of the pool for sharing with pool participants 178. Pool tags 189 refers to the tags or keywords that are recommended for use by the pool participants 178 when tagging the pool images 188 in the image sharing pool 161. By using a smaller set of tags from a recommended pool, tag diversity in decreased, facilitating easier searching of the images through standardization of the tags being used.

Figure 1G:
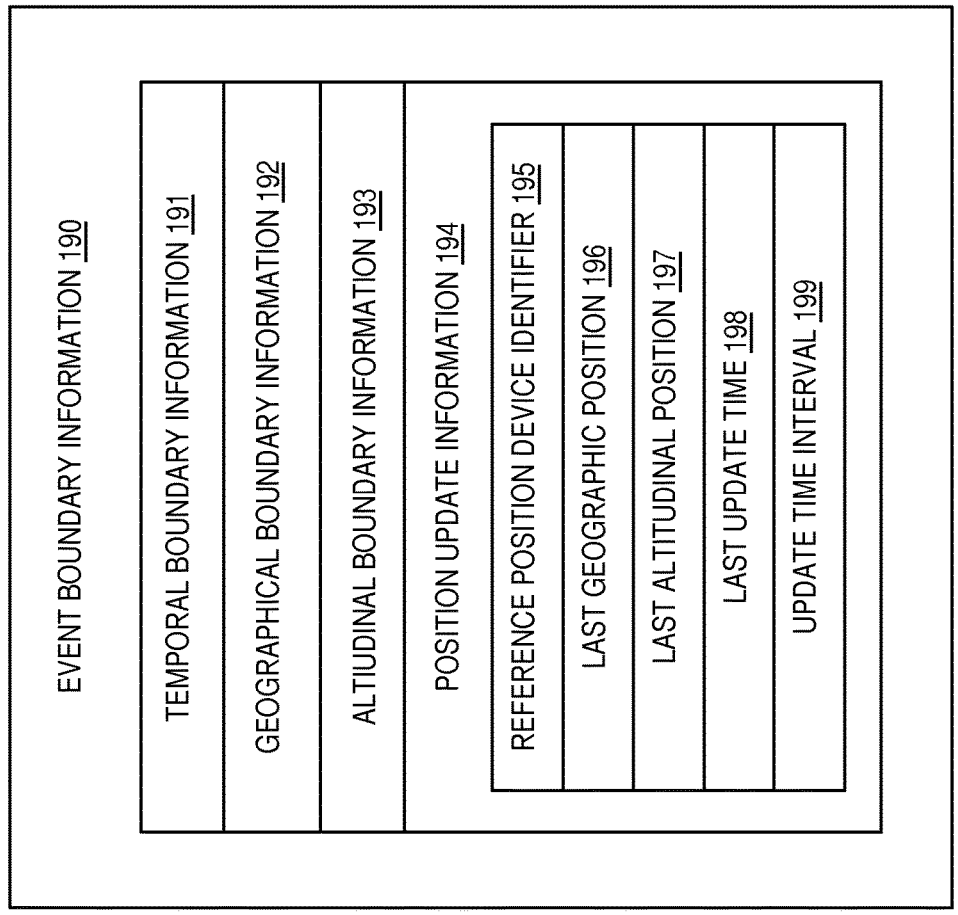
FIG. 1G illustrates a block diagram of an exemplary event boundary information structure according to an aspect of the present disclosure.

Now referring to FIG. 1G, the event boundary information structure is used to represent information defining elements of an event. Temporal boundary information 191 can represent the starting time and ending time of an event. Geographical boundary information 192 comprises information defining the geographical area of an event. This information may be represented in different ways based on differing implementations. In accordance with embodiments of the present disclosure, the geographical boundary information 192 may be specified as a point and radius of an enclosing circle. In other embodiments, specifying the four corners of the shape may specify the geographical boundary information 192 as square or rectangle. In other embodiments, the geographical boundary information 192 may be specified as an arbitrary shape comprised of a series of lines by specifying the start and end point of at least three line segments. In other embodiments, the geographical boundary information 192 may be specified as one or more tile identifiers. In embodiments of the present disclosure, altitudinal boundary information 193 may be provided to distinguish between two separate events occurring at the same spot, but differing altitudes, such as two parties in a high-rise building. An event may also be tied to a reference position device. As the reference position device 80 moves, the position of the event moves accordingly. As the mobile phone moves along with the ship, the event boundary information 190 of the event is periodically updated to account for the changing position of the ship. Position update information 194 may comprise information identifying a reference position device identifier 195, a last geographic position 196 of the reference device 80 indicated by the reference position device identifier 195, a last altitudinal position 197 of the reference position device 80, a last update time 198 of the event boundary information 190, and an update time interval 199 of the event boundary information 190. In embodiments of the present disclosure, the last update time 198 is subtracted from the current time to determine if it is greater than or equal to the update time interval 199. If so, then a position change vector is computed by comparing the current geographic position to the last geographic position 196, and the current altitudinal position to the last altitudinal position 197. This position change vector is added to the geographical boundary information 192 and the altitudinal boundary information 193 to produce updated geographical boundary information and updated altitudinal boundary information. The last geographic position 196 is set to the current geographic position, the last altitudinal position 197 is set to the current altitudinal position, and the last update time 198 is set to the current time.

According to other embodiments of the present disclosure, computing devices 30 may be grouped into an event based on the fact that they a communicatively coupled to a common network, for example, a WiFi network being operated at a venue. In some embodiments, this information is used to form the group of pool participants. In other embodiments, this information is used to augment the geographical information indicating the location of the computing devices 30.

Figure 4A:
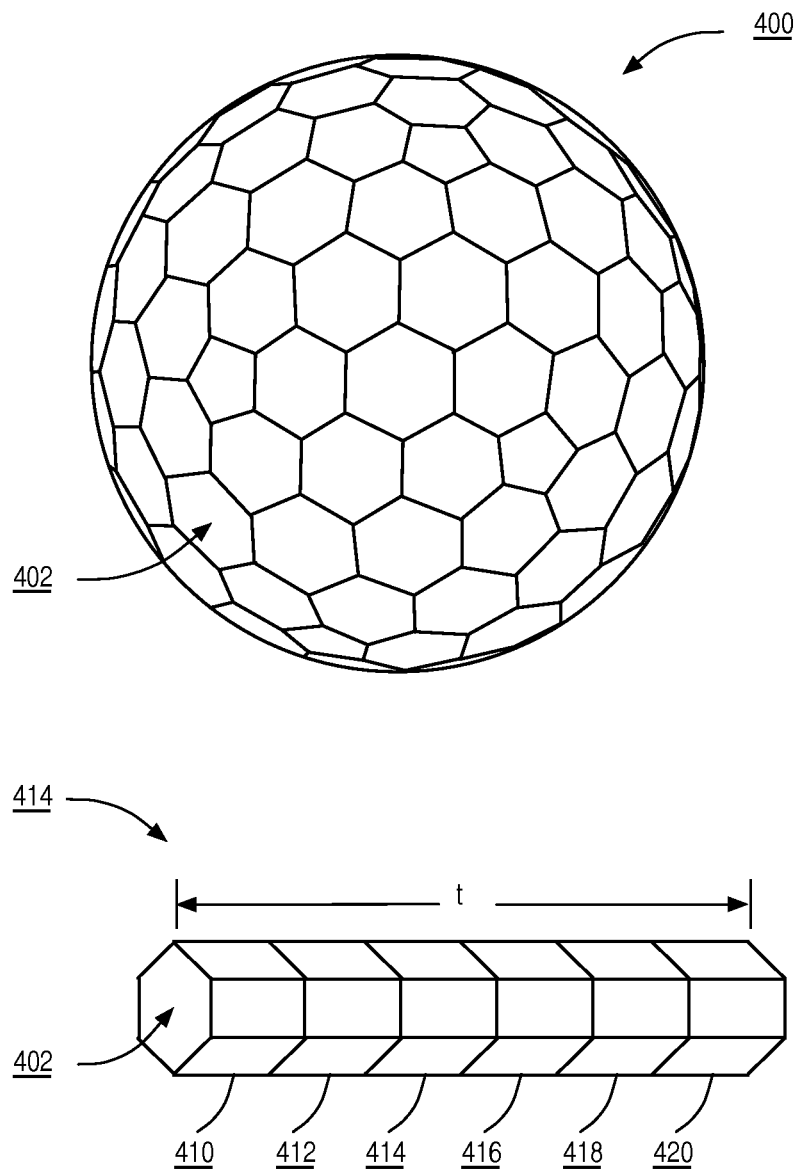
FIG. 4A illustrates a methodology for dividing the surface area of the earth according to one aspect of the present disclosure.
Figure 4B:
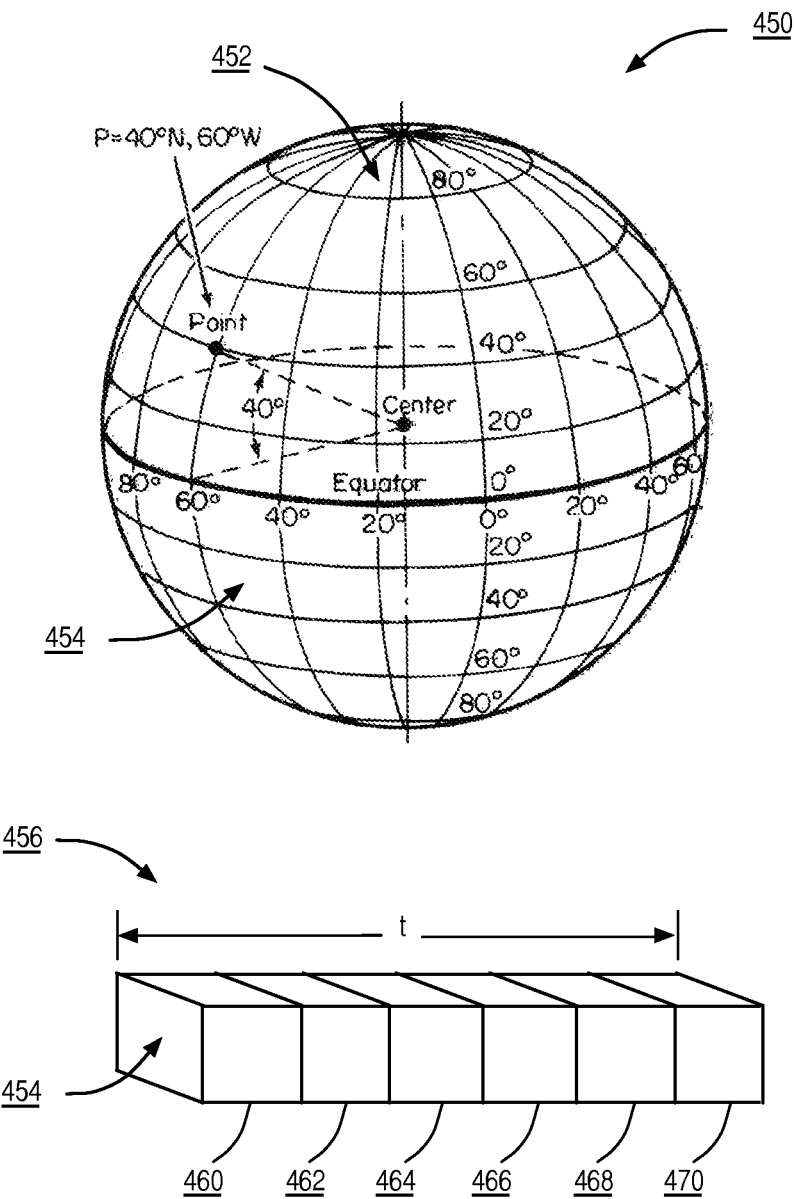
FIG. 4B illustrates an alternate methodology for dividing the surface area of the earth according to another aspect of the present disclosure.

As mentioned above, in embodiments, the boundary information 191-193 may be specified as one or more tile identifiers. In one approach, the tiles may be derived by segmenting the surface of the earth into a series of hexagonal tiles 402 covering the surface of the earth and segmented in time 414 and altitude (not shown). In accordance with other embodiments, the tiles may be derived by segmenting the earth based on latitude and longitude lines 454 and segmented in time 456 and altitude (not shown). In one aspect of the present disclosure the tiles do not overlap as shown in FIGS. 4A & 4B. In another aspect, the tiles may overlap in any combination of time, geography, and altitude.

Figure 2A:
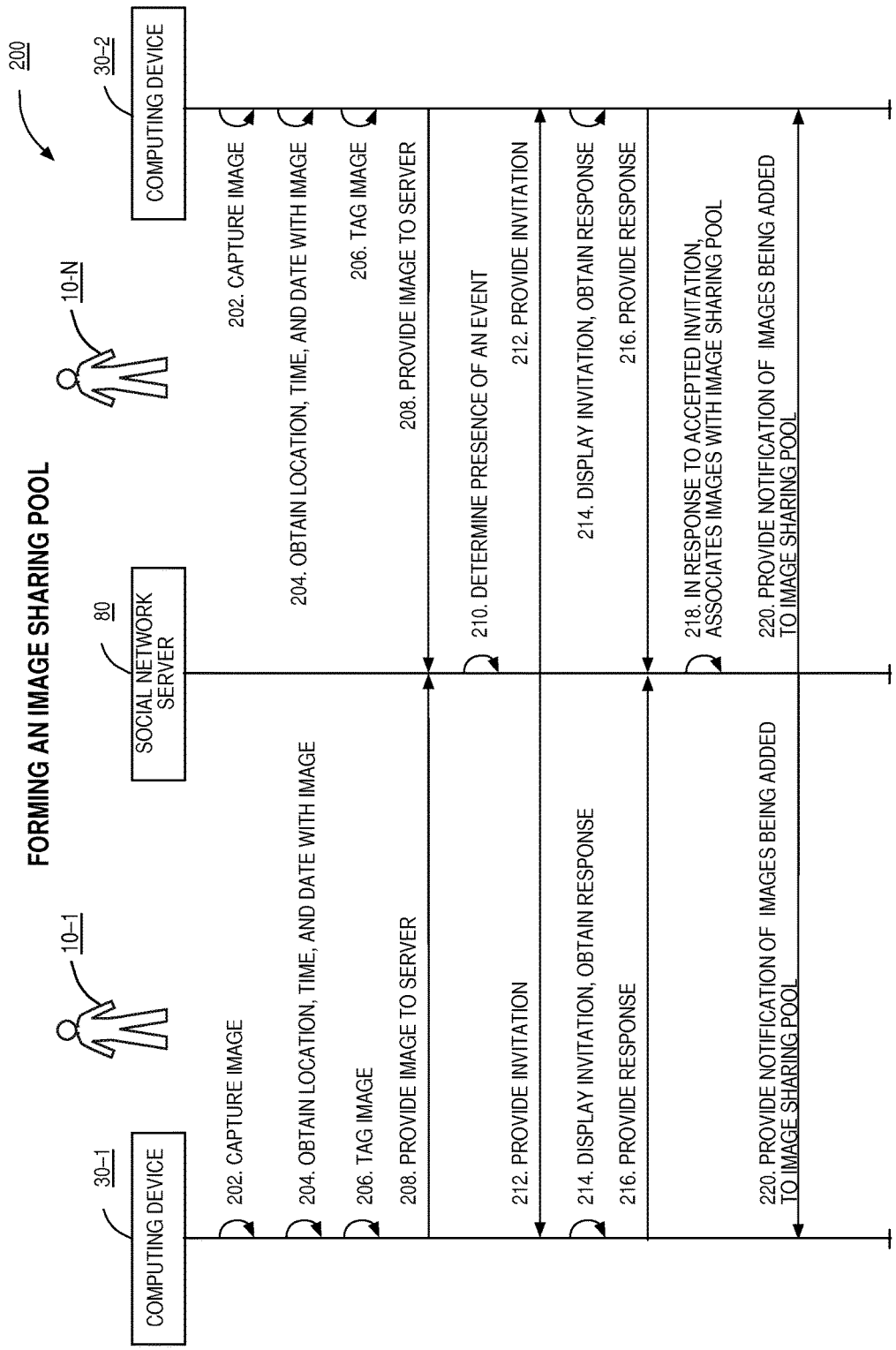
FIGS. 2A & 2B illustrate a network diagram for operating a image sharing pool.
Figure 2B:
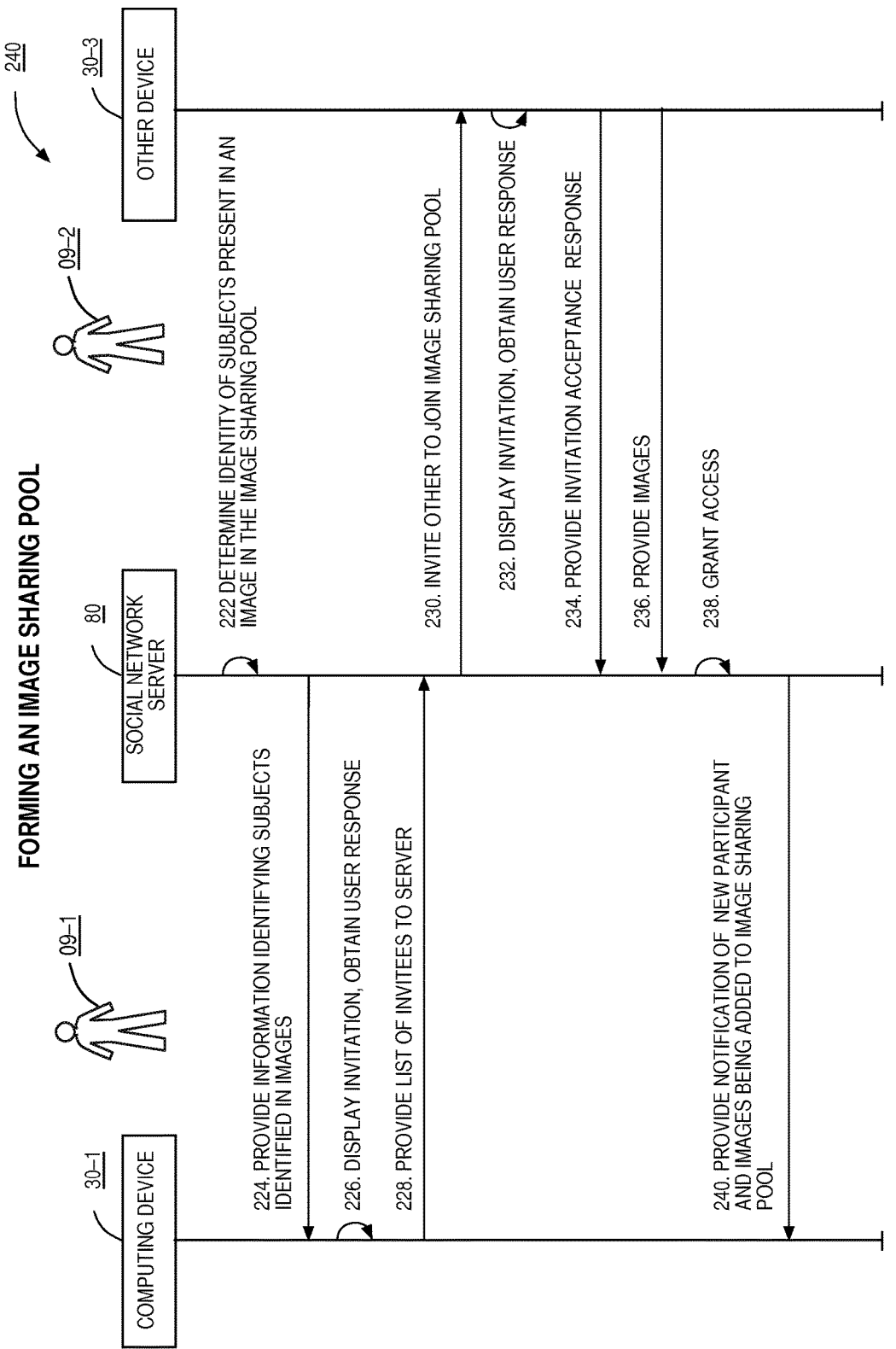

FIGS. 2A and 2B illustrate a network diagram for an exemplary embodiment of operating an image sharing pool 161. Referring now to FIG. 2A, a network flow diagram is presented showing the steps involved in forming an image sharing pool 161. Computing devices 30 capture images 202. Metadata including location, time, and date are obtained 204 and the images are tagged with this information 206. The images are provided to the social network server 40 208. The social network server 40 determines presence of an event 190. In one embodiment, the occurrence of an event may be determined by analyzing the metadata associated with the captured images. This metadata may comprise capture time, capture date, capture location, subject presence, and the like. In other embodiments, the devices 30 may initially only provide the metadata to the social network server 40. In these embodiments, the presence of an event may be determined by the social network server 40 from the metadata without use of the corresponding images. Once an event has been detected, the devices 30 may provide images and/or thumbnails of the images. In other embodiments, a subset of devices 30 may provide only metadata initially, while other devices transmit images initially. The presence of an event may be determined while the event is still occurring, or after the event has finished. In other embodiments of the present disclosure, a user may identify the presence of an event to the social network server 40. Once the presence of an event has been determined, invitations are provided to the respective computing devices 30. The computing device 30 presents invitations to the user 216. In response to a user of a computing device 30 accepting an invitation to join an image sharing pool 161, a signal is provided to the social network server 40 and the server associates the corresponding images with the image sharing pool 161. In embodiments of the present disclosure, all images associated a pool participant 176 captured at the event are contributed to the photo sharing pool. In other embodiments, the pool participant 176 can be allowed to pick and choose which images are contributed to the photo sharing pool when joining the pool if the pool is already in operation, or as they are captured in the case where the image sharing pool 161 is in operation before the image is captured. In another embodiment images associated with the event are presented to the user as part of the invitation to join the image sharing pool 161. As new pool images 188 are contributed to the image sharing pool 161, pool notifications 186 may be provided to users 10 already in the image sharing pool 220 (pool participants 178). Images contributed to the image sharing pool 161 (pool images 188) may contain faces of people (pool subjects 180). In some cases, these pool subjects 180 may be tagged with identification information prior to uploading the images to the social network server 40. Referring now to FIG. 2B, in other cases, the images are analyzed to determine the identity of the pool subjects 180 at the social network server 40 222. In other embodiments, the social network server 40 provides functions enabling pool participants 178 to identify the subjects in the images (pool subjects 180). In embodiments of the present disclosure, once a pool subject 182 is identified, a pool participant 176 contributing an image containing an identified pool subject 182 is presented with a user interface 224 allowing the pool participant 176 to approve extending invitations to the pool subject 226. A list of selected pool subject 182 is provided to the social network server 40 228. The social network server 40 extends invitations to other users 230 corresponding to subjects found in images (pool subjects 180) contributed to the image sharing pool 161. Invitations are displayed to other computing devices 30 and 232, and an invitation acceptance response is provided to the social network server 40 if the invitation is accepted 234. The other user may then contribute images to the image sharing pool 236. In embodiments of the present disclosure, a user is granted provisional rights based on accepting the invitation, and later granted full rights upon contributing a first image to the pool 238. In once aspect of the present disclosure, a provisional right might include the ability to view images. The images may be limited in number and resolution, and/or the provisional right may expire after a trial period. A full right might include unlimited viewing of pool images at full resolution, the ability to annotate and/or tag pool images, the ability to communicate directly with other pool participants 178 through the image sharing pool 161 using chat, texting, or the like. Full rights may exist for the life of the sharing pool 161. Based on pool participant 176 preference settings, notifications are provided to pool participant 178 as new images or pool invitees 176 are accepted into the image sharing pool 161.

Pool participants 178 in an image sharing pool 161 may be identified in a number of different but complementary methods. In embodiments of the present disclosure, the presence of an event 190 is determined base on the analysis of past image submissions. In this embodiment, pool invitees 176 are determined base on identifying images submitted during the event 190, and inviting those users having contributed the images. The faces of users present at the event, as evidence by being captured in images at the event (pool subjects 180) may also be identified according to a number of different means. Once identified, these users may also be invited to join the image sharing pool 161. Pool invitees 176 or pool participants 178 may also be able to nominate other users to be invited to join the image sharing pool 161. Finally, location history of users may be obtained an analyzed. Based on this information, users may be identified who were present at the event 190. These users may also be invited to join the sharing pool 161.

In other embodiments of the present disclosure, a user submitting an image may initiate an image sharing pool 161. In these embodiments, the location, time, date, and composition of the images submitted with the initiation request serve to seed the parameters of the image sharing pool 161. The user initiating the sharing pool 161 may also serve as a pool moderator 174 for the image sharing pool 161. In these embodiments, the moderator may control who may join the image sharing pool 161, and what rights they have in the pool.

Note that some events 190 may be identified occurring solely in the past. For example, the system may identify that a family reunion took place in 2009 where multiple users have submitted images comprising an event. In other cases, an event may be identified or initiated that is still occurring, or that may be planned for the future but have not yet started.

Invitations to join an sharing pool 161 may be comprised of information identifying the parameters of the sharing pool 161, at least one event associated with the sharing pool 161, the pool moderator 174 of the sharing pool 161 if there is one, representative pool images 188 either already in the sharing pool 161 or identified for possible inclusion, other pool participants 178 in the sharing pool 161 who have been invited and have already accepted, and other users who have been invited (pool invitees 176) to join the sharing pool 161 but have not yet accepted, and the like.

When accepting the invitation, a user may be allowed to specify a usage policy for the images they contribute, notification preferences for images being added to the pool, notification preferences for other users being invited, notification preferences for other users accepting invitations.

Figure 3A:
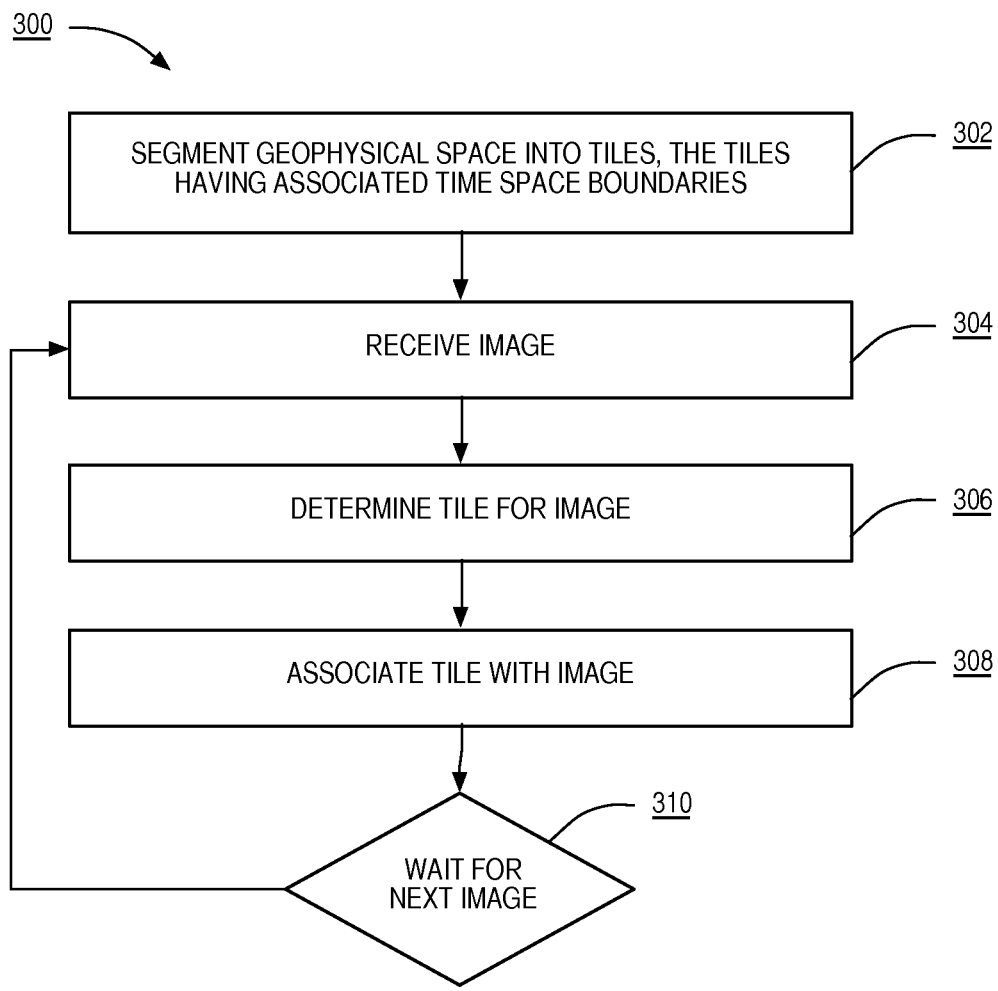
FIGS. 3A & 3B illustrate a flowchart for an exemplary embodiment of identifying an event according to one aspect of the present disclosure.
Figure 3B:
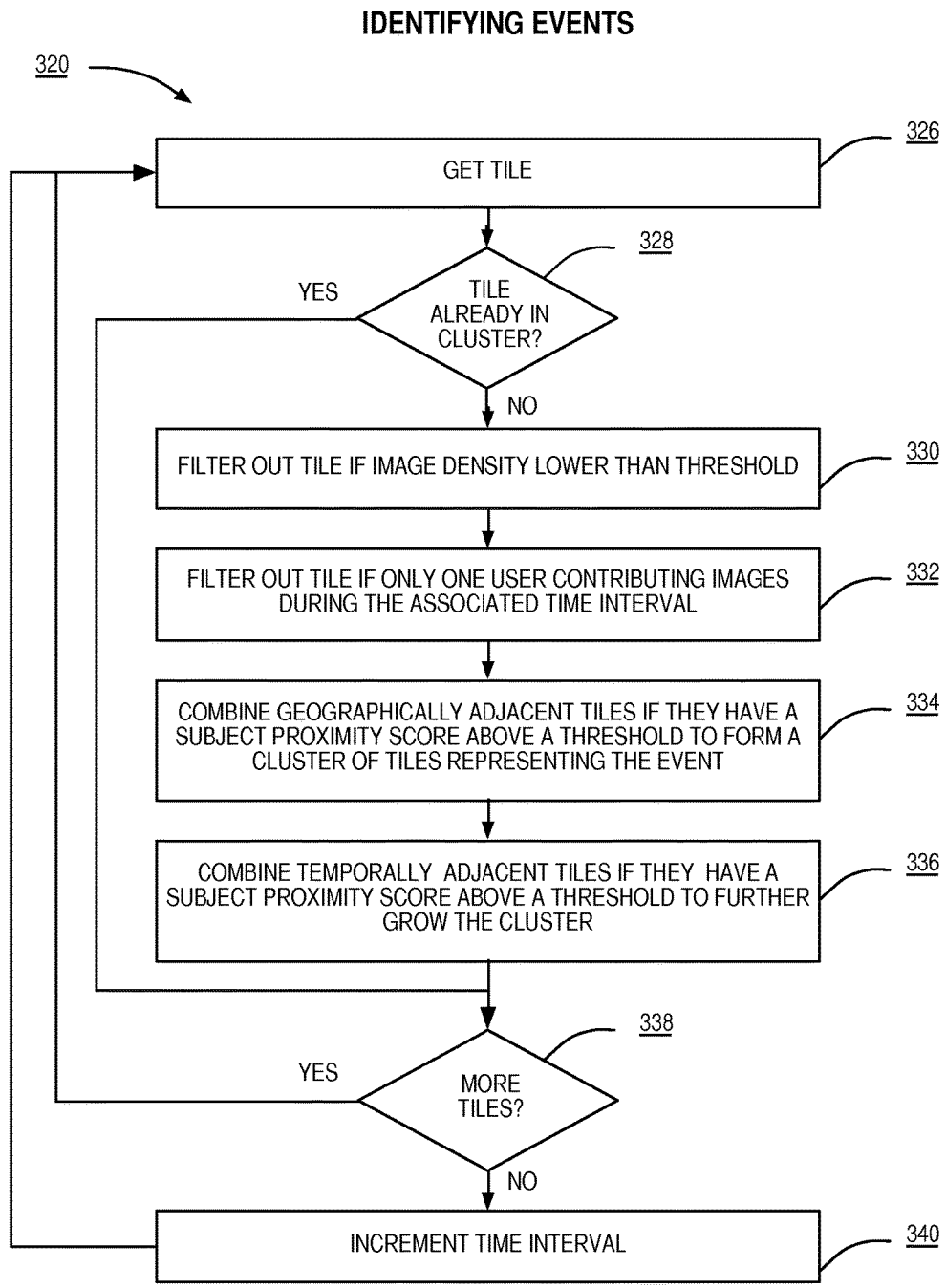

FIG. 3A Illustrates a flowchart for an exemplary embodiment of classifying images according to one aspect of the present disclosure. The geophysical space is segmented into tiles 402 454, the tiles having associated time and space boundaries. The social network server 40 image intake function 53 receives 304 an image. A tile 402 454 is determined for the image 306 based on the geographical location and time at which the image was captured. The tile 402 454 is associated with the image 308. In another embodiment of the present disclosure, images are classified in a batch process that runs periodically in a background thread at the social network server 40. In another embodiment of the present disclosure, images are classified during a process that runs in real time to determine the presence of events 190 as they are occurring.

Referring now to FIG. 3B, an exemplary flowchart for identifying an event is illustrated. A first tile in a time interval is received 326. In accordance with embodiments of the present disclosure, if the tile is already part of a cluster then it is ignored 328. The tiles 402 454 are examined to determine which ones contain a number of images exceeding a threshold. If the number of images falls below the threshold it is removed from consideration 330. Likewise, tiles 402 454 having images only contributed by a single user are also removed from consideration 332. In accordance with embodiments of the present disclosure, tiles 402 454 may be combined with adjacent tiles in space 334 and time 336 to produce an event comprised of multiple tiles. The process continues until all of the tiles in a time interval have been considered 338, then the time interval is incremented 340.

FIG. 4A Illustrates a methodology for dividing the surface area of the earth according to one aspect of the present disclosure. A representation of the earth modeled as a sphere is shown 400. The surface of the planet has been segmented into tiles of hexagonal shape 402. As used herein tiles 402 have both geographical boundaries and temporal boundaries. The geographical boundaries serve to describe the area of the planets surface covered by the tile 402. The temporal boundaries serve to describe the time duration covered by the tile 402 (e.g. the time interval). Graphic 414 shows multiple tiles stacked backed to back covering a time interval (t) and associated with a single geographic area. Tile 410 covers an earlier time interval than the later tiles 412-420.

FIG. 4B Illustrates an alternate methodology for dividing the surface area of the earth according to another aspect of the present disclosure. Again, a representation of earth modeled as a sphere is shown 450. The surface of the planet has been segmented into tiles 454 using latitude and longitude schema. The geographical boundaries serve to describe the area of the planets surface covered by the tile 454. The temporal boundaries serve to describe the time duration covered by the tile 454. Graphic 456 illustrates multiple tiles stacked back to back covering a time interval (t) and associated with a single geographic area. Tile 460 covers an earlier time interval than the later tiles 462-470.

In accordance with embodiments, other approaches may be used in determining the geographic boundaries on an event 190. For example, well-known clustering techniques may be used to determine the presence of the event by clustering images according to geographic location of capture over a time interval. The clustering may be based on one or more cluster models chosen from one or more of the following: connectivity models, centroid models, distribution models, density models, subspace models, group models, graph based models, and the like. The shape of the event may take the form of geometric shape such as a circle, square, polygon, etc. The shape of the event may also be specified as an arbitrary shape specified by points. In one embodiment, the exterior most data points in the cluster provide the geographic boundary of the arbitrary shape. The clustering may include hard clustering (each object belongs to a cluster or not) or soft clustering (each object belongs to each cluster to a certain degree—e.g. a likelihood of belonging to the cluster), strict partitioning clustering (here each object belongs to exactly one cluster), strict partitioning clustering with outliers (objects can also belong to no cluster, and are considered outliers), overlapping clustering (while usually a hard clustering, objects may belong to more than one cluster), hierarchical clustering (objects that belong to a child cluster also belong to the parent cluster), subspace clustering (while an overlapping clustering, within a uniquely defined subspace, clusters are not expected to overlap), and the like.

In other embodiments, the approaches of FIGS. 4A and 4B may be combined with the clustering techniques of the previous paragraph.

Figure 5B:
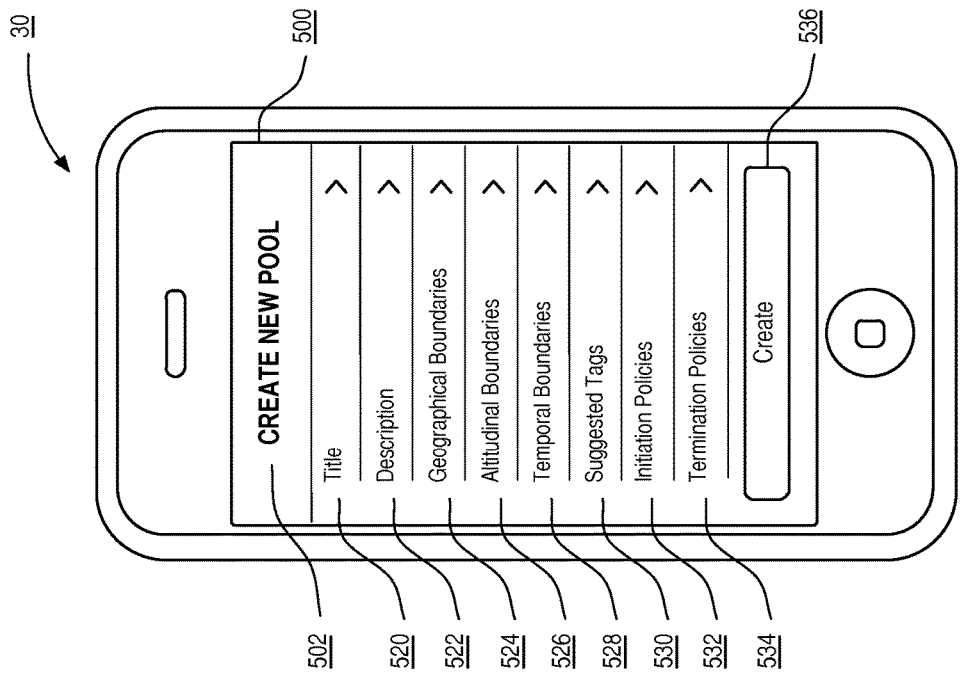
FIG. 5B illustrates an exemplary user interface of a computing device for creating a new event.
Figure 5A:
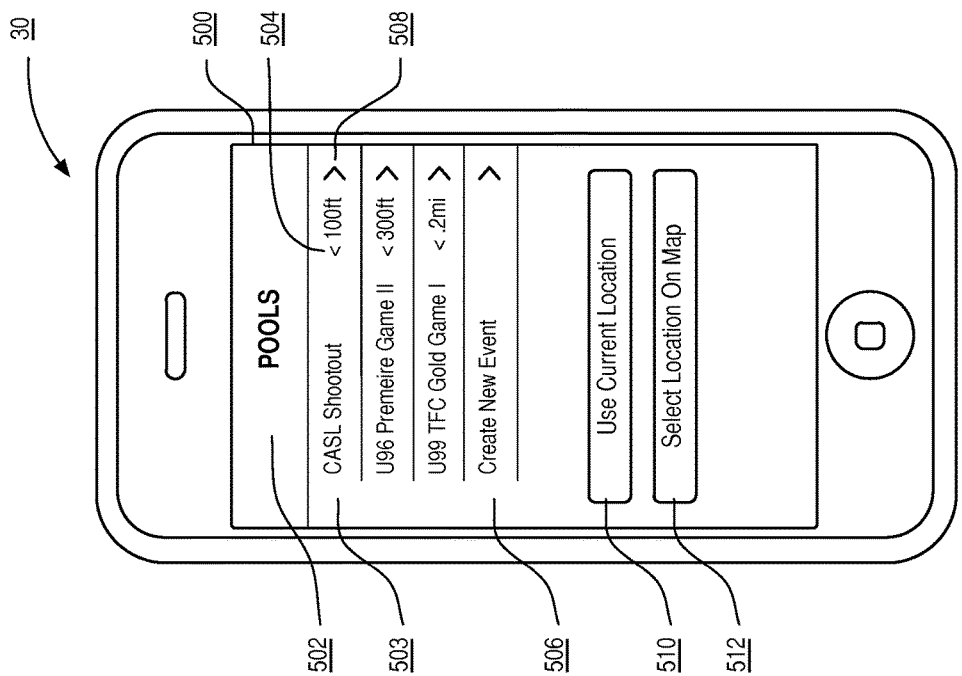
FIG. 5A illustrates an exemplary user interface of a computing device for displaying information identifying other events.

FIG. 5A illustrates an exemplary user interface of a computing device 30 for displaying information identifying other events. The figure shows a display area 500 and a window title 502. The computing device 30 is enabled to present other events occurring according to the FIG. 5A. The user may provide input to the computing device 30 requesting to see events 190 occurring in the area in which they are currently located 510, or they may specify another location 512 differing from their current location. Information may be displayed that includes the name of the event 503, and the distance to event from the current location 504 or a location specified by the computing device 30. The user may access the screens of 6C-6J by selecting a pool to access more information on the pool. In one embodiment, the distance represents the distance to the nearest edge of the geographic boundary of the event 190 associated with the sharing pool 161. In another embodiment, the distance represents the distance to the center of the geographical center of the event. The user may navigate to see more information about an existing event 508, or navigate to create a new event 506.

Other information that may be displayed describing an existing sharing pool 161 may include the description, a graphical display of a map of the event, information reflecting the geographical boundaries 192 of the event, information reflecting the altitudinal boundaries 193 of the event, information reflecting the temporal boundaries 191 of the event, tags that may be used by other computing devices 30 in tagging images contributed to the image sharing pool 161, other users invited to join the sharing pool 161, pool subjects 180 occurring in images already submitted to the image sharing pool 161, and computing devices 30 of users currently located in the geographical area of the event 191. The user may elect to join an existing sharing pool 161, or to create a new sharing pool 161. Based on user input, the computing device 30 may display sharing pools 161 that are currently in process (i.e., have not ended), or sharing pools 161 that have occurred in the past.

FIG. 5B illustrates an exemplary user interface of a computing device 30 for creating a new sharing pool 161. The figure shows a display area 500 and a window title 502. A pool moderator 172 may specify attributes of sharing pool 161 during the creation process, the attributes including inter alia a title 522, description 524, geographical boundary information 526, altitudinal boundary information 528, temporal boundary information 530, suggested tags 532, initiation policies 534, and termination policies 536.

FIG. 5C illustrates an exemplary user interface of a computing device 30 for displaying initiation policy information for an event. The initiation policy information describes how the image sharing pool 161 can be created and managed. The figure shows a display area 500 and a window title 502. Pool images 188 may be shared with the public 540 (only pool participants can upload images, but the public can access pool images), only with other pool participants 178 542, or may include friends of pool participants 178 544. A pool moderator 172 may elect to provide invitations to computing devices 30 associated with users who's faces are found in images shared from the pool (pool subjects 546), to computing devices 30 associated with users who visit the event (event visitors 548), and to a computing devices 30 associated with a list of invitees 550 specified by the pool moderator 172. In one aspect of the present disclosure a pool moderator 172 may choose at least one of the invitation policies. The pool moderator 172 may specify that the sharing pool 161 is closed (wherein pool participants 178 are not allowed to extend invitations to other users), that invitations are pool moderator 172 approved (pool participants 178 can invite others, but pool moderator 172 must approve before they are made pool participants 172), or that that sharing pool is open (pool participants 172 may invite other users without pool moderator 172 approval) 556. In addition, a user may discover the presence of a sharing pool 161 as described in FIG. 5A. If the discovered sharing pool is public 540, the user may access the images or request to become a pool participant 178 (so as to upload images). If the discovered sharing pool is not public, the user may request of the pool moderator 172 to join the sharing pool 161.

In accordance with embodiments of the disclosure, when the pool images 186 are to be shared with the public 540, all other controls 542-552 in the user interface are disabled and non operable. When the pool images 186 are to be shared only with the pool participants 542 the other controls 542-552 in the user interface are enabled.

For an image sharing pool 161 to be operable, there must be at least two pool participants. For example a single pool participant would have no one to share images with, thus the image sharing pool 161 would be of limited use. The pool moderator 172 may increase the minimum number of pool participants 178 (invitation acceptance count 554) to a number greater than the default of 2 to make sure there is a critical mass before making the pool operable.

FIG. 5D illustrates an exemplary user interface of a computing device 30 for displaying termination policy information for an image sharing pool 161. The termination policy information describes how the image sharing pool 161 (and associated sharing activities) may be ended. The figure shows a display area 500 and a window title 502. In accordance with embodiments of the present disclosure, a pool moderator 172 may elect to end sharing for each computing device 30 associated with a pool participant 176 when the device exits the event area 560. In another aspect of the present disclosure, a pool moderator 172 may elect to end sharing for all computing devices 30 associated with pool participants 178 when the first computing device 30 exits the event area 562. In other embodiments of the present disclosure, a pool moderator 172 may elect to end sharing for all computing devices 30 associated with pool participants 178 when the last computing device 30 exits the event area 564. In another aspect of the present disclosure, a pool moderator 172 may elect to end sharing for all computing devices 30 associated with pool participants 178 on a specific date and time 564 as specified 574 by the pool moderator 172. In another aspect of the present disclosure, a pool moderator 172 may elect to end sharing for all computing devices 30 associated with pool participants 178 when on a specific date and time 566 specified by the pool moderator 172. In another aspect of the present disclosure, a pool moderator 172 may elect to end sharing for all computing devices 30 associated with pool participants 178 when no pool participant 176 has accessed the pool images for a set period of time 568. In other embodiments of the present disclosure, a 172 may elect to end sharing for all computing devices 30 associated with pool participants when no pool participant 176 has contributed additional pool images for a set period of time 570. In other embodiments of the present disclosure, a pool moderator 172 may elect to end sharing for all computing devices 30 based on explicit direction 572.

Figure 6B:
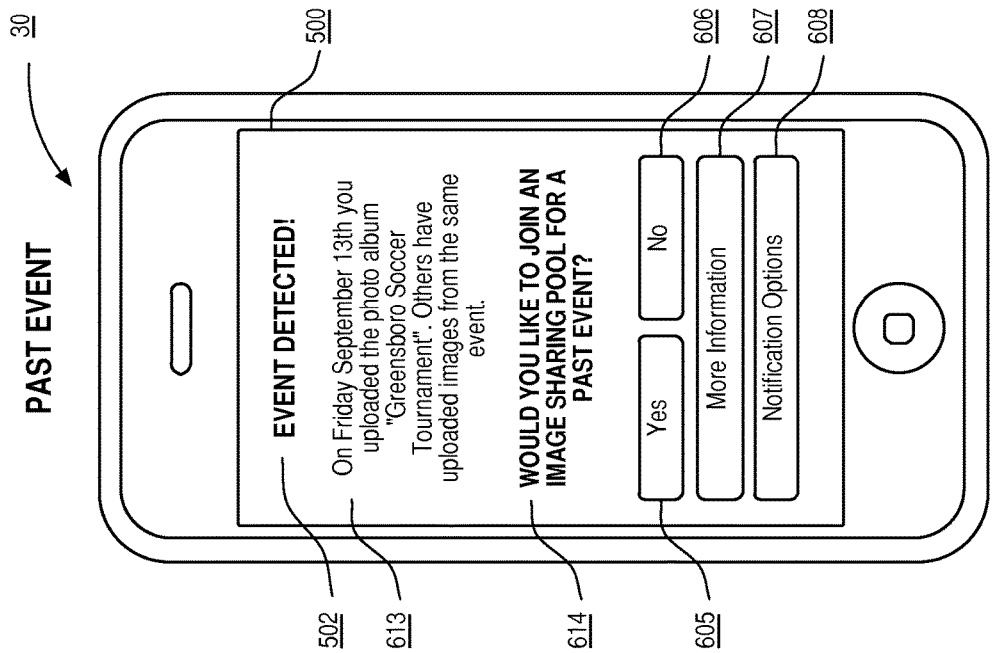
FIG. 6B illustrates an exemplary user interface of a computing device for forming an image sharing pool around a past event according to one aspect of the present disclosure.
Figure 6A:
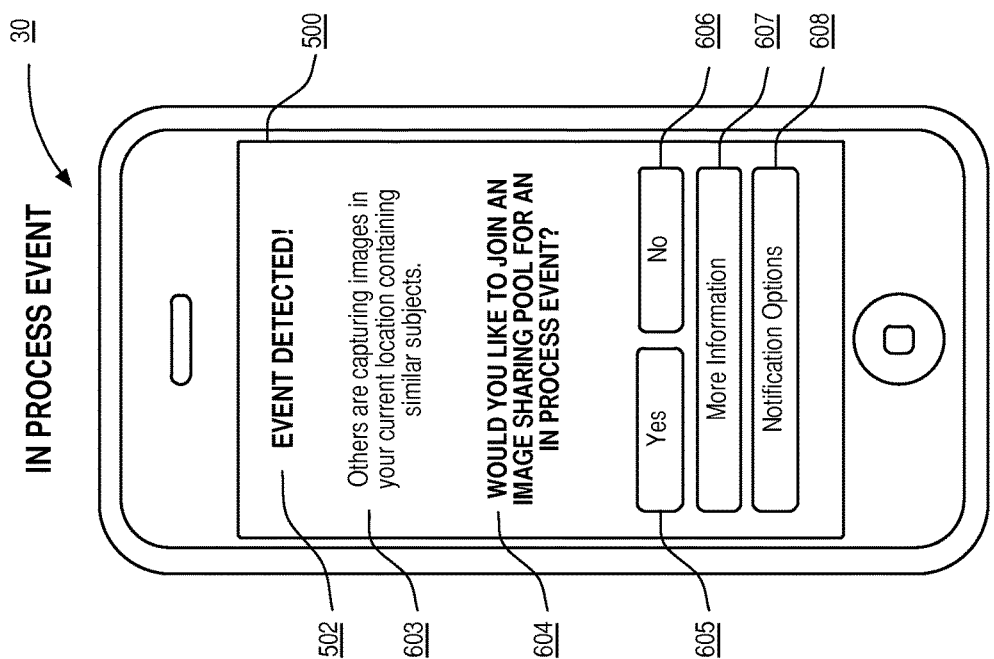
FIG. 6A illustrates an exemplary user interface of a computing device for forming an image sharing pool around an in-process event according to one aspect of the present disclosure.

FIG. 6A illustrates an exemplary user interface of a computing device 30 for forming an image sharing pool 161 around an in-process event according to one aspect of the present disclosure. The figure shows a display area 500 and a window title 502. The window title 502 is displayed indicating to the user that an event has been detected. The user is informed that "Others are capturing images in your current location containing similar subjects" 603. The user is prompted with the question "would you like to join an image sharing pool 161 for an in process event" 604. An "in process" event refers to the scenario where they user is notified of an event while the event is occurring, or in real-time. The user may confirm 605 their interest in joining the image sharing pool 161, decline to join 606, request more information 607, or customize their participation through viewing and selecting more options 608.

FIG. 6B illustrates an exemplary user interface of a computing device 30 for forming an image sharing pool 161 around a past event according to one aspect of the present disclosure. The figure shows a display area 500 and a window title 502. The window title 502 is displayed indicating to the user that an event has been detected. The user is informed, "On Friday September 13th you uploaded the photo album "Greensboro Soccer Tournament". Others have uploaded images from the same event." 613. The user is prompted with the question "would you like to join an image sharing pool for a past event" 614. A "past" event refers to the scenario where they user is notified of an event that has occurred in the past but is no longer occurring. The user may confirm 605 their interest in joining the image sharing pool 161, decline to join 606, request more information 607, or customize their participation through viewing and selecting more options 608.

Figure 6F:
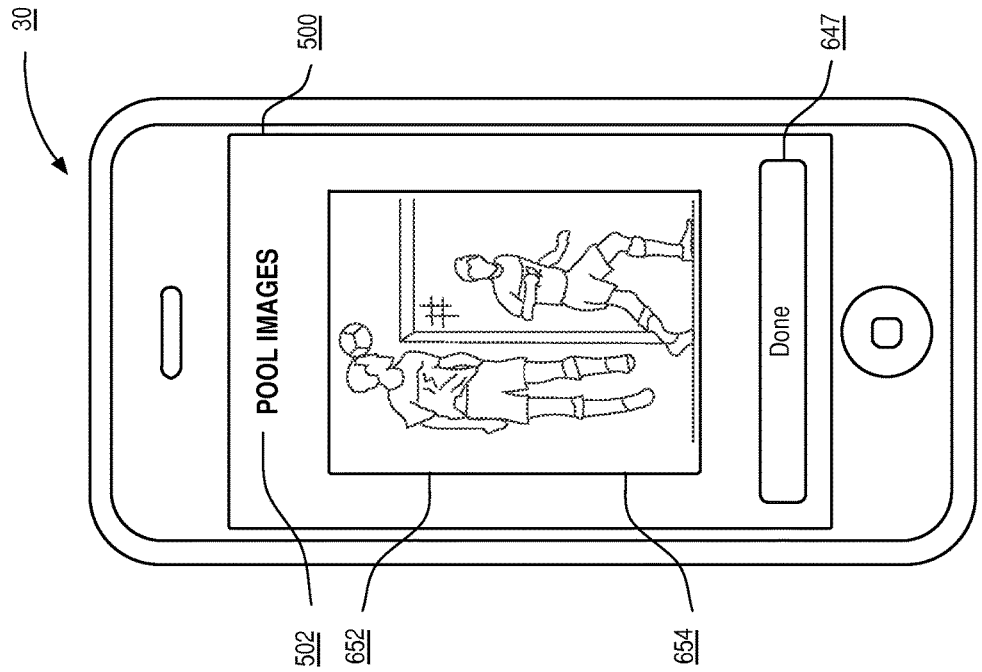
FIG. 6F illustrates an exemplary user interface of a computing device for showing pool images in a sharing pool according to one aspect of the present disclosure.
Figure 6E:
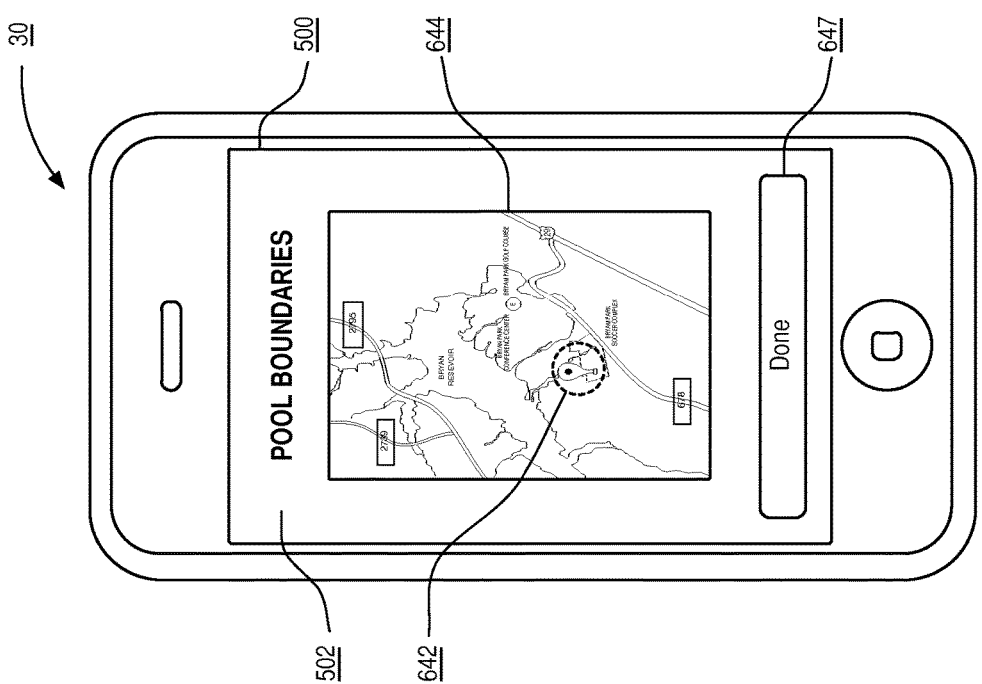
FIG. 6E illustrates an exemplary user interface of a computing device for displaying geographic event boundary information for an image sharing pool according to one aspect of the present disclosure.
Figure 6H:
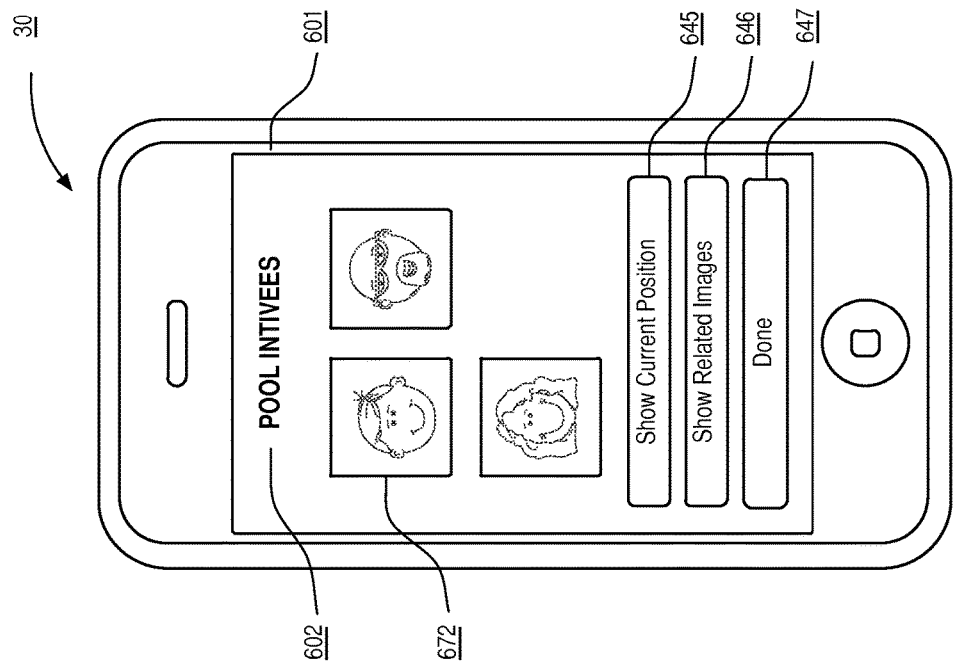
FIG. 6H illustrates an exemplary user interface of a computing device for displaying pool invitee information for an image sharing pool according to one aspect of the present disclosure.
Figure 6G:
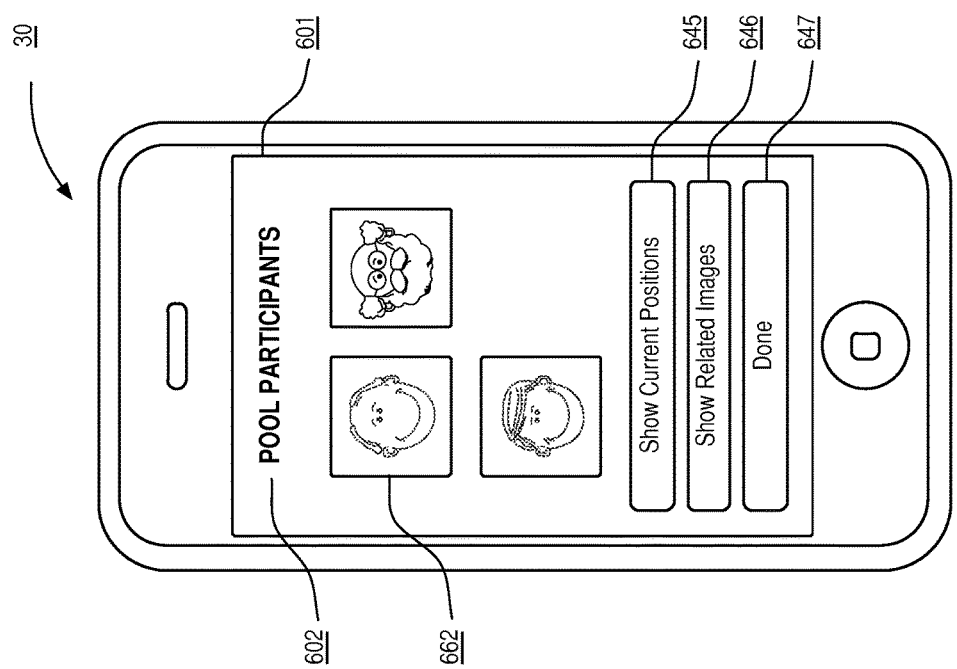
FIG. 6G illustrates an exemplary user interface of a computing device for displaying pool participant information for an image sharing pool according to one aspect of the present disclosure.

FIG. 6C illustrates an exemplary user interface of a computing device 30 for providing a user with information on an image sharing pool 161 according to embodiment of the present disclosure. The figure shows a display area 500 and a window title 502. The window title 502 is displayed indicating to the user that more information is being presented. The user is enabled to view additional information by selecting the appropriate button. The "POOL BOUNDARIES" button 621 operates to show information about the geographical boundaries of the event related to the image sharing pool 161. In one aspect of the present disclosure, the user interface of FIG. 6E is displayed in response to selecting the "POOL BOUNDARIES" button 621. The "POOL IMAGES" button 622 operates to show information about the images available for sharing through the image sharing pool 161. In embodiments of the present disclosure, the user interface of FIG. 6F is displayed in response to selecting the "POOL IMAGES" button 622. The "POOL PARTICIPANTS" button 623 operates to show information about the pool participants 178 associated with the image sharing pool 161. In embodiments of the present disclosure, the user interface of FIG. 6G is displayed in response to selecting the "POOL PARTICIPANTS" button 623. The "POOL INVI- TEES" button 624 operates to show information about the users who have been invited to join the image sharing pool 161. In one aspect of the present disclosure, the user interface of FIG. 6H is displayed in response to selecting the "POOL INVITEES" button 624. The "POOL SUBJECTS" button 626 operates to show information about the faces of users contained in images shared by image sharing pool 161. In embodiments of the present disclosure, the user interface of FIG. 6I is displayed in response to selecting the "POOL SUBJECTS" button 626. The "POOL TAGS" button 628 operates to show information about the pool tags 189 associated with images shared by image sharing pool 161. In embodiments of the present disclosure, the user interface of FIG. 6J is displayed in response to selecting the "POOL TAGS" button 628.

The buttons include event boundary information 621, images that have been contributed to the image sharing pool 622, participants that have joined the image sharing pool 623 (pool participants 178), invitees who have been extended an invitation to join the image sharing pool 624 (pool invitees 176). At any time in the viewing process, the user is enabled to select the done button 630.

FIG. 6D illustrates an exemplary user interface of a computing device 30 for providing a user with an ability to select notifications options to receive regarding an image sharing pool 161 according to one aspect of the present disclosure. The figure shows a display area 500 and a window title 502 of "NOTIFICATION OPTIONS". The user interface enables an user to select to receive notifications including but are not limited to a notification that a user is invited to join the image sharing pool 632, a notification that an invited user has joined the image sharing pool 634, a notification that a new image has been associated with the pool 636, a notification that a pool image has been annotated and information identifying the person contributing the annotation 638, a notification that an image sharing pool 161 has started 640, a notification that an image sharing pool 161 has ended 642, a notification that the users face has been identified in an image that has been contributed to the pool, a notification that a friends face has been identified in an image that has been contributed to the pool 646, and a notification that an image sharing pool 161 has been proposed for an event that you are currently present for. In one aspect of the present disclosure a user may select zero to all of the possible notifications. The user may select the "OK" 634 button to confirm the selected settings, or select the "Cancel" 636 button to keep the current settings. Based on the settings specified in FIG. 6D, the social network server 40 may provide a computing device 30 with a customized activity feed for the sharing pool 161. In accordance with embodiments, the activity feed may be presented on one or more display devices 90.

FIG. 6E illustrates an exemplary user interface of a computing device 30 for displaying geographic event boundaries for an image sharing pool 161 according to one aspect of the present disclosure. The figure shows a display area 500 and a window title 502 "POOL BOUNDARIES". In embodiments of the present disclosure, the event boundary information 642 is shown in map form 644. At any time in the viewing process, the user is enabled to select the "Done" button 647. The map 644 may be superimposed with information identifying the location of users associated with the sharing pool, devices associated with the sharing pool, and images associated with the sharing pool (pool images). Users associated with the pool may include pool participants, pool invitees, pool subjects, and pool moderators. Devices associated with the pool may include computing devices 30, a reference position device 80, and one or more display devices 90.

FIG. 6F illustrates an exemplary user interface of a computing device 30 for showing images in an image sharing pool 161 according to embodiments of the present disclosure. The figure shows a display area 500 and a window title 502 "POOL IMAGES". The display area 500 is operable to display pool images 652 654 and related image metadata and tag information. At any time in the viewing process, the user is enabled to select the "Done" button 647.

FIG. 6G illustrates an exemplary user interface of a computing device 30 for displaying participant information for an image sharing pool 161 according to one aspect of the present disclosure. The figure shows a display area 500 and a window title 502 "POOL PARTICIPANTS". Information regarding pool participants 178 is displayed 662. Pool participants 178 are users of the system who have joined the image sharing pool 161. Based on user input, the interface is operable to display the current geographical position 645 of one or more pool participants 178, and/or images related 646 to the one or more pool participants 178. At any time in the viewing process, the user is enabled to select the "Done" button 647.

FIG. 6H illustrates an exemplary user interface of a computing device 30 for displaying pool invitee 176 information for an image sharing pool 161 according to one aspect of the present disclosure. The figure shows a display area 500 and a window title 502 "POOL INVITEES". Information regarding pool invitees 176 may be displayed 672. They may include users of the system, persons who are not currently users of the system (i.e. have not interacted with the system and have no user account 72). The pool invitees 176 may or may not be present in images already contributed to the image sharing pool 161. Based on user input, the interface is operable to display the current geographical position 645 of one or more pool invitees 176, and/or images related 646 to the one or more pool invitees 176. At any time in the viewing process, the user is enabled to select the "Done" button 647.

FIG. 6I illustrates an exemplary user interface of a computing device 30 for displaying information regarding pool subjects 180 an image sharing pool 161 according to one aspect of the present disclosure. The figure shows a display area 500 and a window title 502 of "POOL SUBJECTS". As used herein, a pool subject 180 is a user whose face appears in at least one of the pool images 188. Elements of the user interface show pool subjects 680 appearing in the pool images 188. Based on user input, the interface is operable to display the current geographical position 645 of one or more pool subjects 180, and/or images related 646 to the one or more pool subjects 180. The user may select "Done" when finished 647.

FIG. 6J illustrates an exemplary user interface of a computing device 30 for displaying pool tag 189 information for an image sharing pool 161 according to one aspect of the present disclosure. The figure shows a display area 500 and a window title 502 of "POOL TAGS". The user interface displays the tag 682, a number of images that the tag is currently associated with 697, and a navigation control that when selected displays the images to which the tag is associated with 698. The user may select "Done" when finished 647.

Figure 7A:
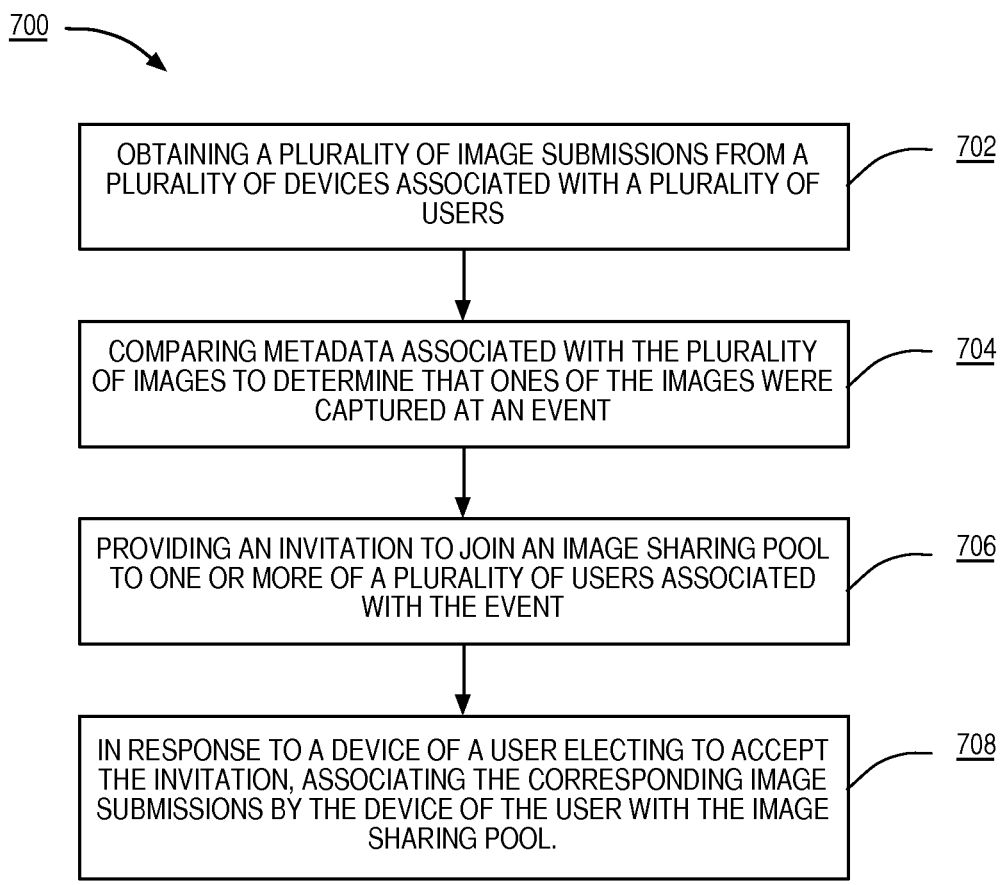
FIG. 7A illustrates a flowchart of an exemplary embodiment for forming an image sharing pool according to one aspect of the present disclosure.

FIG. 7A illustrates a flowchart for an exemplary embodiment of forming an image sharing pool 161 according to one aspect of the present disclosure. The social network server 40 obtains a plurality of image submissions from a plurality of computing devices 30 associated with a plurality of users 702. In one aspect of the present disclosure the computing device 30 is a cellular phone with image capture capabilities, networking capabilities to communicate over the Internet, and a geographical positioning system operable to determine the location of the device. The event detection function 62 operates to compare metadata associated with the plurality of images to determine that ones of the images that were captured at an event 704. Once the presence of an event has been detected, the social function 44 operates to provide invitations to join an image sharing pool 161 to one or more of a plurality of computing devices 30 associated with a corresponding plurality of users associated with the event 706. Upon receiving confirmation from a computing device 30 of a user electing to accept an the invitation to join the image sharing pool 161, associating images submitted by the associated computing device 30 with the image sharing pool 708.

Figure 7B:
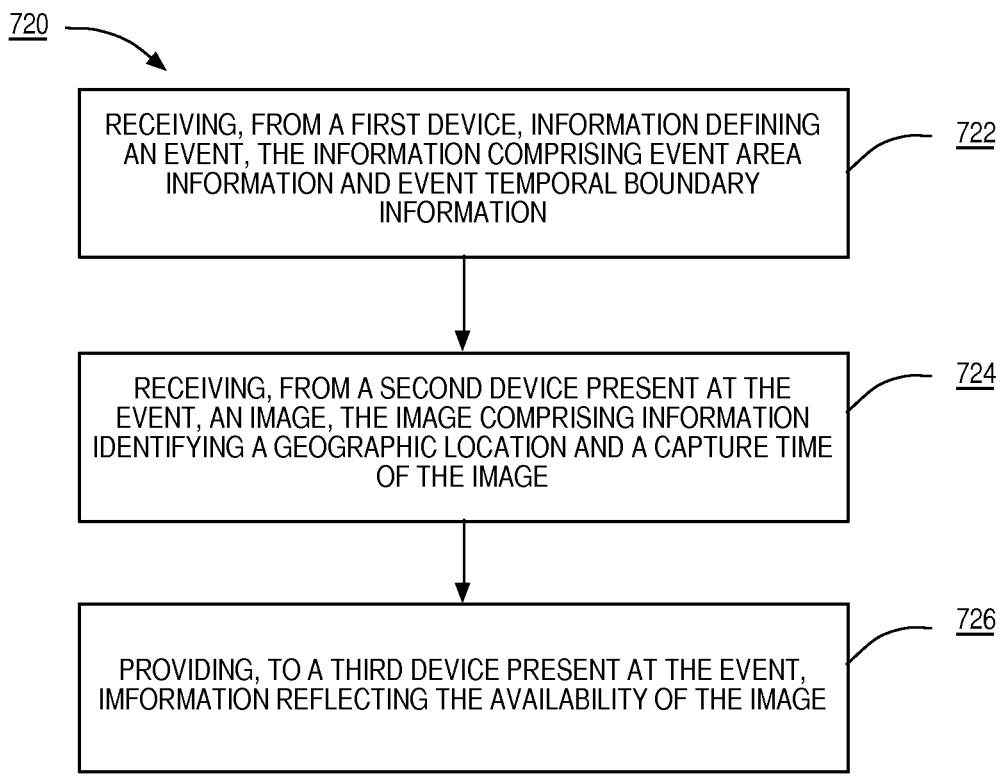
FIG. 7B illustrates a flowchart of an exemplary embodiment for forming an an image sharing pool proposed a device according to one aspect of the present disclosure.

FIG. 7B illustrates a flowchart for an exemplary embodiment for sharing images at a user specified event. The social network server 40 receives information defining an image sharing pool 161 from a first computing device 30-1 and 722. The event information includes at least information identifying the geographical boundaries of the event area, and a start time for the image sharing pool 161. An end time for the event may be received, but it is not required. The social network server 40 may also receive additional event information as reflected in the user interface described in FIG. 5B "CREATE NEW EVENT". The social network server 40 receives an image captured at the event from a second computing device 30-2 and 724. The image is provided with information identifying at least the geographical area of capture, as well at the time of capture. Additional information associated with the image 102 may also be provided. The social network server 40 provides a third computing device 30-3, which is located at the event when the notification is provided, information reflecting the availability of the image captured at the event 726.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Figure 7C:
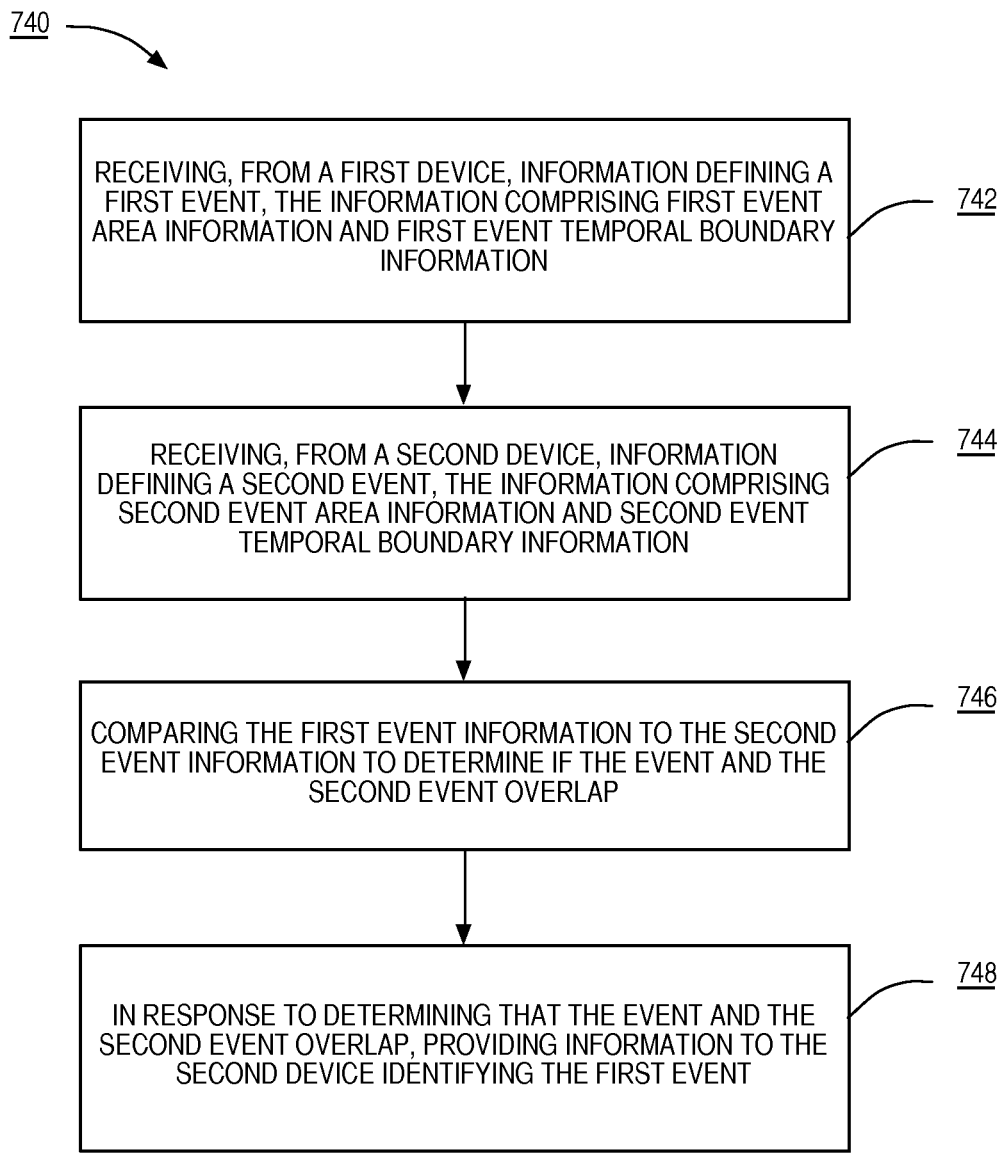
FIG. 7C illustrates a flowchart of an exemplary embodiment for displaying information regarding related image sharing pools based on a proposed image sharing pool according to one aspect of the present disclosure.

FIG. 7C illustrates a flowchart for an exemplary embodiment for identifying related events to a computing device 30 of a user. The social network server 40 receives first information defining a first image sharing pool 161 from a first computing device 30-1 742. The event boundary information 190 includes at least information identifying the geographical boundary information 192 and temporal boundary information 191. The temporal boundary information 191 comprises at least a start time for the event, but an end time for the event it is not required (a.k.a an in-process event). The social network server 40 may also receive additional event information as reflected in the user interface described in FIG. 5B "CREATE NEW EVENT". The social network server 40 receives second information defining a second image sharing pool 161 from a second computing device 30-1 and 744. The first event boundary information 190-1 and the second event boundary information 190-2 are compared to determine if the two events overlap 746. In one embodiment of the present disclosure, two events are determined to overlap of they share at least common geographical boundary information 192 and temporal boundary information 191. In another embodiment of the present disclosure, additional and/or different requirements may be specified to determine when two events overlap. This matching information may be provided to the social network server in the form of configuration information. In response to determine that the first event and second event overlap. Information is provided to the second device identifying at least one other related event 748.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Figure 7D:
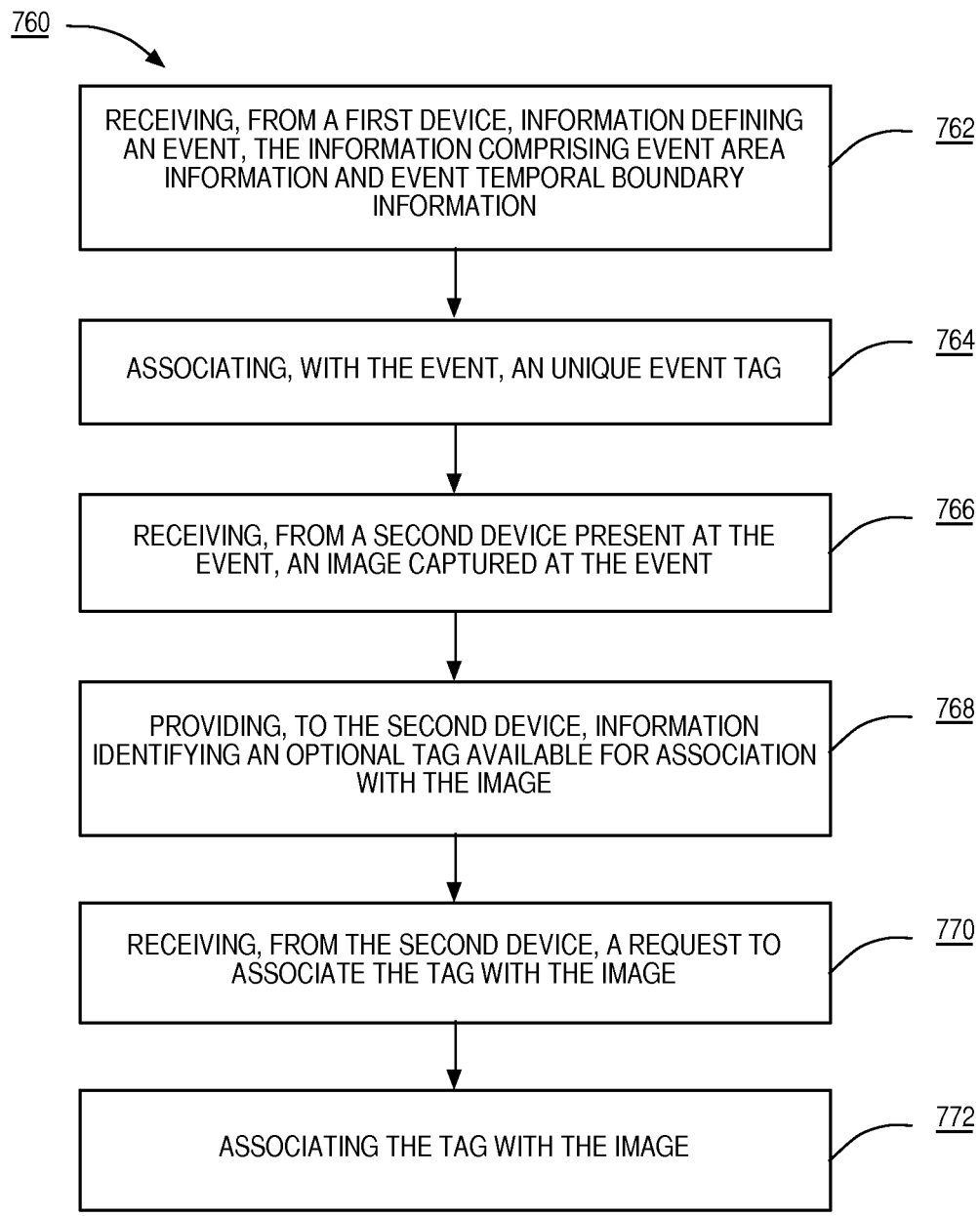
FIG. 7D illustrates a flowchart for an exemplary embodiment for suggesting a tag associated with an image sharing pool based on receiving an image captured at the event associated with the pool according to one aspect of the present disclosure.

FIG. 7D illustrates a flowchart for an exemplary embodiment for tagging images at a user specified event 190. The social network server 40 may receive first information defining a first image sharing pool 161 from a first computing device 30-1 and 762. The event information includes at least information identifying the geographical boundaries of the event area, and a start time for the image sharing pool 161. An end time for the event may be received, but it is not required. The social network server 40 may also receive additional event information as reflected in the user interface described in FIG. 5B "CREATE NEW EVENT". A unique tag is associated with the event and/or sharing pool 764. An image captured at the event is received from a second device 766. The event tag is provided to the second device 768. Information is received from the second device reflecting that the event tag should be associated with the image 770. The event tag is associated with the image 772. In accordance with other embodiments, the tag may be selected by the server to be unique among the first event, unique among all events associated with the first sharing pool, unique among all events having been operated by the server, and unique among all sharing pools having been operated by the server.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Figure 8:
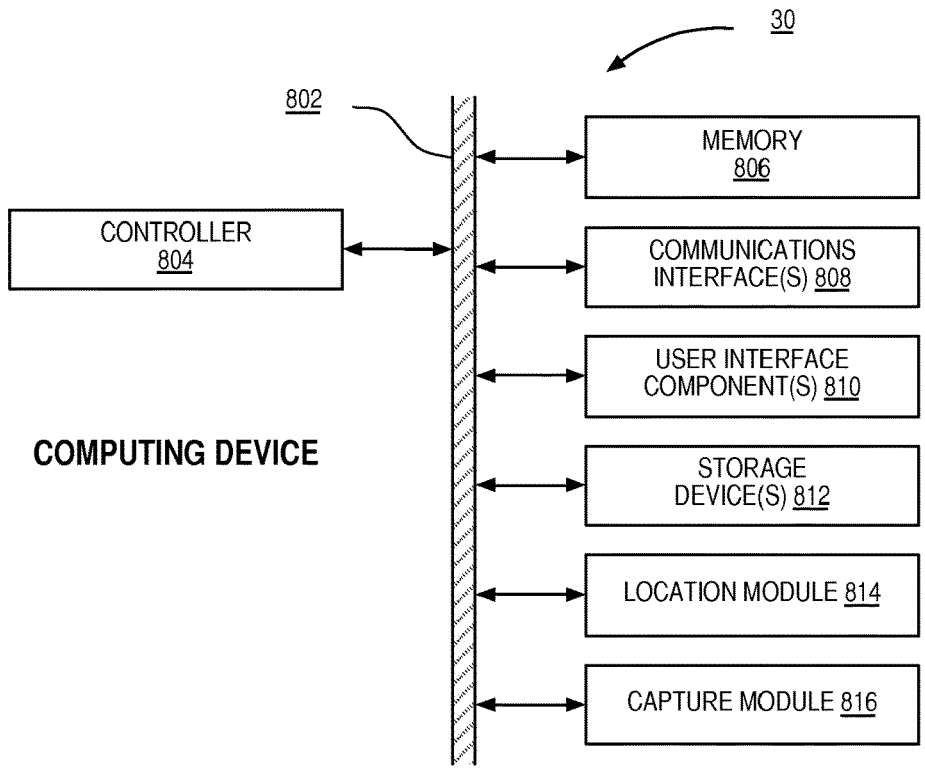
FIG. 8 is a block diagram of the computing device of FIG. 1A according to one aspect of the present disclosure.

FIG. 8 is a block diagram of a computing device 30 (e.g., one or more computing devices 30 of FIG. 1A) according to one embodiment of the present disclosure. As illustrated, the computing device 30 includes a controller 804 connected to memory 806, one or more communications interfaces 808, one or more user interface components 810, one or more storage devices 812, a location module 814, and an image capture module 816 by a bus 802 or similar mechanism. The controller 804 is a microprocessor, digital ASIC, FPGA, or the like. In general, the computing device 30 includes a control system 32 having associated memory 806. In this embodiment, the controller 804 is a microprocessor, and the browsing function 33, notification engine 35, upload function 36, and UI function 37 are implemented in software and stored in the memory 806 for execution by the controller 804. However, the present disclosure is not limited thereto. The aforementioned functions and engine may be implemented in software, hardware, or a combination thereof. The computing device 30 also includes a communication interface 808 enabling the computing device 30 to connect to the network 20 (FIG. 1A). The one or more user interface components 810 include, for example, a touchscreen, a display, one or more user input components (e.g., a keypad), a speaker, or the like, or any combination thereof. The storage device(s) 812 is a non-volatile memory used to store user accounts 72, the image repository 100, and the image sharing pool repository 160 and the like. In this embodiment, the location module 814 is a hardware component, such as a GPS receiver. However, the present invention is not limited thereto. The location determination function 38 may be implemented in software, hardware, or a combination thereof. In this embodiment, the image capture module 816 is comprised of a lens arrangement, color filter array (CFA), CCD or CMOS image sensor, and an analog to digital convertor (ADC).

Figure 9:
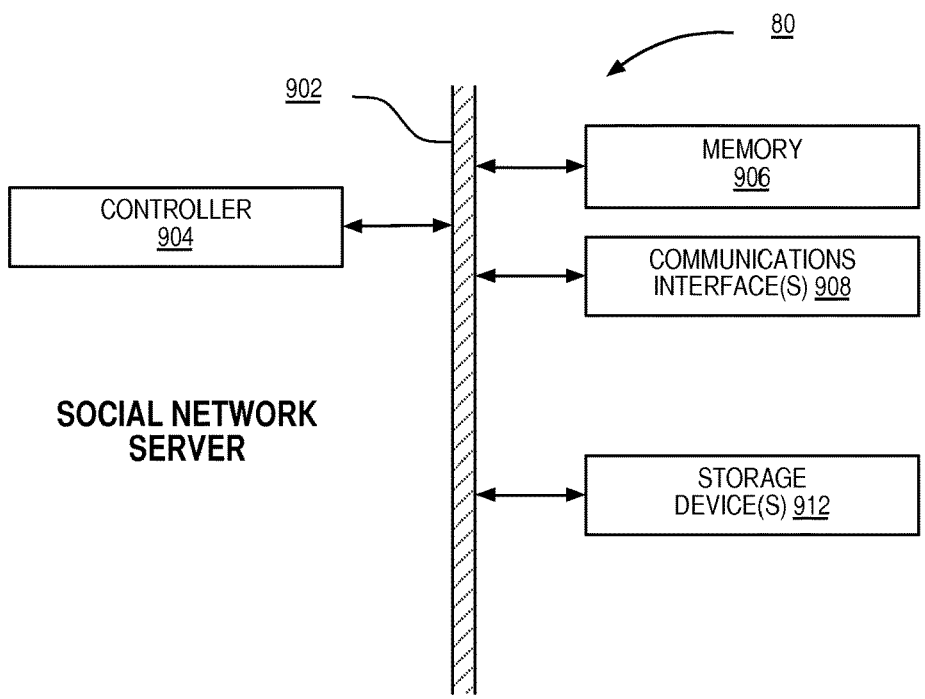
FIG. 9 is a block diagram of the social network server of FIG. 1A according to one aspect of the present disclosure.

FIG. 9 is a block diagram of a social network server 40 of FIG. 1A according to an embodiment of the present disclosure. As illustrated, social network server 40 includes a controller 904 connected to a memory 906, one or more secondary storage devices 912, and one or more communications interfaces 908 by a bus 902 or similar mechanism. The controller 904 is a microprocessor, digital Application Specific Integrated Circuit ASIC, Field Programmable Gate Array FPGA, or the like. In general, the social network server 40 includes a control system 42 having associated memory 906. In this embodiment, the controller 904 is a microprocessor, and the social function 44, presentation function 46, and imaging engine 50 are implemented in software and stored in the memory 906 for execution by the controller 904. However, the present disclosure is not limited thereto. The aforementioned functions and engine may be implemented in software, hardware, or a combination thereof. Further, the user account repository 70, the image repository 100, and the image sharing pool repository 160 may be stored in the one or more secondary storage devices 912. The secondary storage devices 912 are digital data storage devices such as, for example, one or more hard disk drives. The social network server 40 also includes a communication interface 908 enabling the social network server 40 to connect to the network 20 (FIG. 1A).

Figure 10:
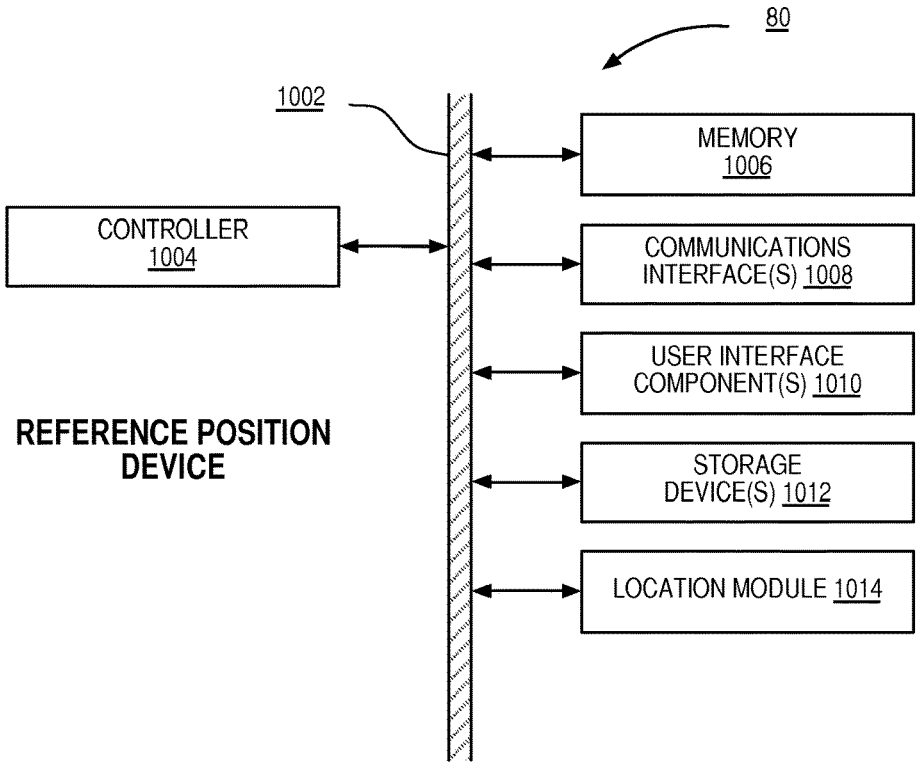
FIG. 10 is a block diagram of the reference position device of FIG. 1A according to one aspect of the present disclosure.

FIG. 10 is a block diagram of a reference position device 80 according to one embodiment of the present disclosure. As illustrated, the reference position device 80 includes a controller 1004 connected to memory 1006, one or more communications interfaces 1008, one or more user interface components 1010, one or more storage devices 1012, and a location module 1014 by a bus 1002 or similar mechanism. The controller 1004 is a microprocessor, digital ASIC, FPGA, or the like. In general, the reference position device 80 includes a control system 82 having associated memory 1006. In this embodiment, the controller 1004 is a microprocessor, and the reference function 84 is implemented in software and stored in the memory 1006 for execution by the controller 1004. However, the present disclosure is not limited thereto. The reference function 84 may be implemented in software, hardware, or a combination thereof. In this embodiment, the location module 1014 is a hardware component. For example, the location module 1014 may be a GPS receiver. However, the present invention is not limited thereto. The reference function 84 may be implemented in software, hardware, or a combination thereof. The reference position device 80 also includes a communication interface 1008 enabling the reference position device 80 to connect to the network 20 (FIG. 1A). The one or more user interface components 1010 include, for example, a touchscreen, a display, one or more user input components (e.g., a keypad), a speaker, or the like, or any combination thereof. The storage device(s) 1012 is a non-volatile.

Figure 11:
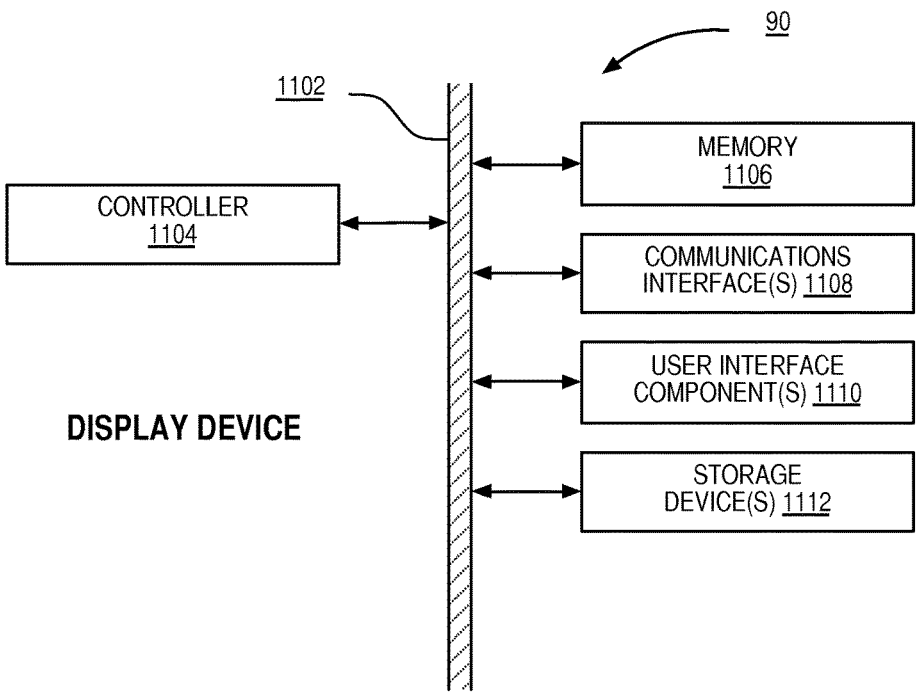
FIG. 11 is a block diagram of the display device of FIG. 1A according to one aspect of the present disclosure.

FIG. 11 is a block diagram of a display device according to one embodiment of the present disclosure. As illustrated, the display device 90 includes a controller 1104 connected to memory 1106, one or more communications interfaces 1108, one or more user interface components 1110, one or more storage devices 1112 by a bus 1102 or similar mechanism. The controller 1104 is a microprocessor, digital ASIC, FPGA, or the like. In general, the display device 90 includes a control system 92 having associated memory 1106. In this embodiment, the controller 1104 is a microprocessor, and the display function 94 is implemented in software and stored in the memory 1106 for execution by the controller 1104. However, the present disclosure is not limited thereto. The display function 94 may be implemented in software, hardware, or a combination thereof. The display device 90 also includes a communication interface 1108 enabling the reference display device 90 to connect to the network 20 (FIG. 1A). The one or more user interface components 1110 include, for example, a touchscreen, a display, one or more user input components (e.g., a keypad), a speaker, or the like, or any combination thereof. The storage device(s) 1112 is a non-volatile memory.

Those skilled in the art will recognize improvements and modifications to the embodiments of the present disclosure. All such improvements and modifications are considered within the scope of the concepts disclosed herein and the claims that follow.

What is claimed is:

1. A method of operating a server, the method comprising:
   identifying an in-process event, the in-process event comprising geographical boundary information and start time information derived from metadata associated with a plurality of images received from a plurality of mobile devices over a network;
   communicating, to a first device of the plurality of mobile devices, a first invitation to join a sharing pool associated with the in-process event, the first invitation configured to display a map of a geographical area of the in-process event, the map superimposed with geographical boundary information of the in-process event and individual geographical locations of two or more other devices participating in the sharing pool;
   granting provisional rights, to a second device, based on receiving a second acceptance of a second invitation from the second device; and
   granting permanent rights, to the second device, in response to the second device contributing at least one image to the sharing pool.

2. The method of claim 1, in granting rights, further comprising:
   providing, to the second device, the second invitation to join the sharing pool;
   receiving, from the second device, the second acceptance of the second invitation;
   in response to receiving the second acceptance of the second invitation from the second device, associating the images received from the second device with the sharing pool; and
   providing a first notification to the first device indicating that the sharing pool is available for use.

3. The method of claim 1, in communicating the first invitation, further comprising:
   providing, to the first device, a first notification, the first notification further indicating that the images from the second device are available for sharing;

receiving, from the first device, a request for at least one image associated with the sharing pool and received from the second device; and providing, to the first device, the at least one image associated with the sharing pool and received from the second device.

4. The method of claim 1 further comprising:
identifying at least one pool subject present in at least one image associated with the sharing pool;
identifying a third device associated with the at least one pool subject; and
selecting, by the server, the third device associated with the at least one pool subject as the third device to receive a third invitation to join the sharing pool.

5. The method of claim 1 further comprising:
identifying a third device currently at the in-process event; and
selecting, by the server, the third device currently at the in-process event as the third device to receive a third invitation to join the sharing pool.

6. The method of claim 5 wherein identifying the third device currently geographically located at the in-process event further comprises:
receiving a last reported geographic location of the third device;
performing a comparison of the last reported geographic location of the third device to the geographical boundary information and the start time information; and
based on the comparison, determining that the third device is currently at the in-process event.

7. The method of claim 6 wherein the last reported geographic location of the third device is no older than fifteen minutes.

8. The method of claim 1 wherein the first invitation is comprised of three or more of:
information identifying event geographical boundaries,
information identifying event temporal boundaries,
information identifying event altitudinal boundaries,
information identifying an invitee to join the sharing pool,
information identifying status of the sharing pool, and
information identifying a termination policy of the sharing pool.

9. The method of claim 1 wherein the first device is one of a mobile cellular phone, tablet computing device, and network enabled camera.

10. The method of claim 1 wherein the information defining the sharing pool is further comprised of three or more of:
information identifying event geographical boundaries,
information identifying event temporal boundaries,
information identifying event altitudinal boundaries,
information identifying an invitee of the sharing pool,
information identifying a participant of the sharing pool,
information identifying a termination policy of the sharing pool,
information identifying a tag associated with the in-process event, and
information identifying a tag associated with the sharing pool.

11. The method of claim 1 wherein the sharing pool is associated with a display device, wherein the display device is one of a networked television, a set-top-box communicatively coupled to a display, a digital picture frame, an electronic billboard, and a public venue display.

12. The method of claim 1 wherein the sharing pool is determined to have ended based on:

a last device associated with a pool participant leaving the geographical area specified by the geographical boundary information.

13. The method of claim 1 further comprising:
communicating, to ones of the plurality of mobile devices, an other invitation to join the sharing pool;
receiving, from ones of the plurality of mobile devices, an acceptance of the other invitation;
performing a comparison of a count of other invitation acceptances to a minimum threshold number of pool participants; and
based on the comparison, initiating the sharing pool if the count of other invitation acceptances is greater than or equal to the minimum threshold number of pool participants.

14. A server device comprising:
a network interface operable to communicatively couple the server device to a plurality of mobile devices over a network; and
a processor and memory, coupled to the network interface, operable to:
identify an in-process event, the in-process event comprising geographical boundary information and start time information derived from metadata associated with a plurality of images received from the plurality of mobile devices over the network;
communicate, to a first device of the plurality of mobile devices, a first invitation to join a sharing pool associated with the in-process event, the first invitation configured to display a map of a geographical area of the in-process event, the map superimposed with geographical boundary information of the in-process event and individual geographical locations of two or more other devices participating in the sharing pool;
grant provisional rights, to a second device, based on receiving a second acceptance of a second invitation from the second device; and
grant permanent rights, to the second device, in response to the second device contributing at least one image to the sharing pool.

15. The server device of claim 14, where in to grant rights, the processor and the memory further are operable to:
provide, to the second device, the second invitation to join the sharing pool;
receive, from the second device, the second acceptance of the second invitation;
in response to receiving the second acceptance of the second invitation from the second device, associate the images received from the second device with the sharing pool; and
provide a first notification to the first device indicating that the sharing pool is available for use.

16. The server device of claim 14, where in to communicate the first invitation, the processor and the memory are further operable to:
provide, to the first device, a first notification, the first notification further indicating that the images from the second device are available for sharing;
receive, from the first device, a request for at least one image associated with the sharing pool and received from the second device; and
provide, to the first device, the at least one image associated with the sharing pool and received from the second device.

17. The server device of claim 14 wherein the processor and the memory are further operable to:

identify at least one pool subject present in at least one image associated with the sharing pool;

identify a third device associated with the at least one pool subject; and select, by the server, the third device associated with the at least one pool subject as the third device to receive a third invitation to join the sharing pool.

18. The server device of claim 14 wherein the processor and the memory are further operable to:

identify a third device currently at the in-process event; and select, by the server, the third device currently at the in-process event as the third device to receive a third invitation to join the sharing pool.

19. The server device of claim 18 where in to identify the third device currently geographically located at the in-process event the processor and the memory are further operable to:

receive a last reported geographic location of the third device;

perform a comparison of the last reported geographic location of the third device to the geographical boundary information and the start time information; and based on the comparison, determine that the third device is currently at the in-process event.

20. The server device of claim 19 wherein the last reported geographic location of the third device is no older than fifteen minutes.

21. The server device of claim 14 wherein the first invitation is comprised of three or more of:

information identifying event geographical boundaries,
information identifying event temporal boundaries,
information identifying event altitudinal boundaries,
information identifying an invitee to join the sharing pool,
information identifying status of the sharing pool, and
information identifying a termination policy of the sharing pool.

22. The server device of claim 14 wherein the first device is one of a mobile cellular phone, tablet computing device, and network enabled camera.

23. The server device of claim 14 wherein the information defining the sharing pool is further comprised of three or more of:

information identifying event geographical boundaries,
information identifying event temporal boundaries,
information identifying event altitudinal boundaries,
information identifying an invitee of the sharing pool,
information identifying a participant of the sharing pool,
information identifying a termination policy of the sharing pool,
information identifying a tag associated with the in-process event, and
information identifying a tag associated with the sharing pool.

24. The server device of claim 14 wherein the sharing pool is associated with a display device, wherein the display device is one of a networked television, a set-top-box communicatively coupled to a display, a digital picture frame, an electronic billboard, and a public venue display.

25. The server device of claim 14 wherein the sharing pool is determined to have ended based on:

a last device associated with a pool participant leaving the geographical area specified by the geographical boundary information.

26. The server device of claim 14 wherein the processor and the memory are further operable to:

communicate, to ones of the plurality of mobile devices, an other invitation to join the sharing pool;

receive, from ones of the plurality of mobile devices, an acceptance of the first other invitation;

perform a comparison of a count of other invitation acceptances to a minimum threshold number of pool participants; and based on the comparison, initiate the sharing pool if the count of other invitation acceptances is greater than or equal to the minimum threshold number of pool participants.

27. A server device comprising:

a network interface operable to communicatively couple the server device to a plurality of mobile devices over a network; and a processor and memory, coupled to the network interface, operable to:

communicate, to a device of the plurality of mobile devices, an invitation to join a sharing pool associated with an event, the invitation configured to display a map of a geographical area of the event, the map superimposed with geographical boundary information of the event and individual geographical locations of two or more other devices participating in the sharing pool;

grant provisional rights, to the device, based on receiving an acceptance of the invitation from the device; and grant permanent rights, to the device, in response to the device contributing at least one image to the sharing pool.

* * * * *